United States Patent
Miura

(10) Patent No.: US 8,488,162 B2
(45) Date of Patent: Jul. 16, 2013

(54) COMMUNICATION APPARATUS USING RECONNECTION REQUEST, METHOD OF CONTROLLING THE SAME, AND STORAGE MEDIUM

(75) Inventor: Shigeo Miura, Tokyo (JP)

(73) Assignee: Canon Kabushiki Kaisha (JP)

( * ) Notice: Subject to any disclaimer, the term of this patent is extended or adjusted under 35 U.S.C. 154(b) by 559 days.

(21) Appl. No.: 12/732,270

(22) Filed: Mar. 26, 2010

(65) Prior Publication Data
US 2010/0245880 A1    Sep. 30, 2010

(30) Foreign Application Priority Data
Mar. 26, 2009 (JP) .................................. 2009-076592

(51) Int. Cl.
G06K 15/00 (2006.01)
G06F 3/12 (2006.01)
G06F 3/00 (2006.01)

(52) U.S. Cl.
USPC ......... 358/1.15; 358/1.9; 358/1.13; 358/1.14; 710/39; 710/40

(58) Field of Classification Search
USPC .............. 358/1.13–1.15, 437; 455/41.1–41.3; 400/61–63, 70, 76; 710/39, 40, 6
See application file for complete search history.

(56) References Cited

U.S. PATENT DOCUMENTS

| | | | |
|---|---|---|---|
| 5,923,440 A * | 7/1999 | Goto | 358/406 |
| 6,104,499 A * | 8/2000 | Yamada | 358/1.15 |
| 7,318,679 B2 * | 1/2008 | Sakai | 400/62 |
| 7,392,299 B2 * | 6/2008 | Maekawa | 709/220 |
| 8,150,449 B2 * | 4/2012 | Onozawa | 455/550.1 |
| 2002/0103909 A1 * | 8/2002 | Devine et al. | 709/227 |
| 2004/0053573 A1 * | 3/2004 | Karusawa | 455/41.2 |
| 2004/0078520 A1 * | 4/2004 | Don et al. | 711/114 |
| 2004/0203359 A1 * | 10/2004 | Sasai et al. | 455/41.1 |
| 2007/0149124 A1 * | 6/2007 | Onozawa | 455/41.2 |
| 2007/0288680 A1 * | 12/2007 | Tominaga et al. | 710/313 |
| 2010/0141989 A1 * | 6/2010 | Kitahara et al. | 358/1.15 |
| 2010/0167651 A1 * | 7/2010 | Sakuda et al. | 455/41.2 |
| 2010/0225951 A1 * | 9/2010 | Koshigaya | 358/1.14 |

FOREIGN PATENT DOCUMENTS
JP    2007-251851 A    9/2007

* cited by examiner

*Primary Examiner* — Dennis Dicker
(74) *Attorney, Agent, or Firm* — Rossi, Kimms & McDowell LLP

(57) ABSTRACT

A communication apparatus which prevents one host computer from occupying the apparatus and enables a user of the host computer having sent a processing request thereto to quickly know a processing result. A connection request is accepted from one of a plurality of host computers. In response to the accepted connection request, the host computer having sent the connection request is connected, and a process requested by the connected host computer is executed. Information indicative of the connected host computer is stored. Control is performed such that a reconnection request from the host computer indicated by the stored information is accepted with priority over connection requests from other host computers.

10 Claims, 20 Drawing Sheets

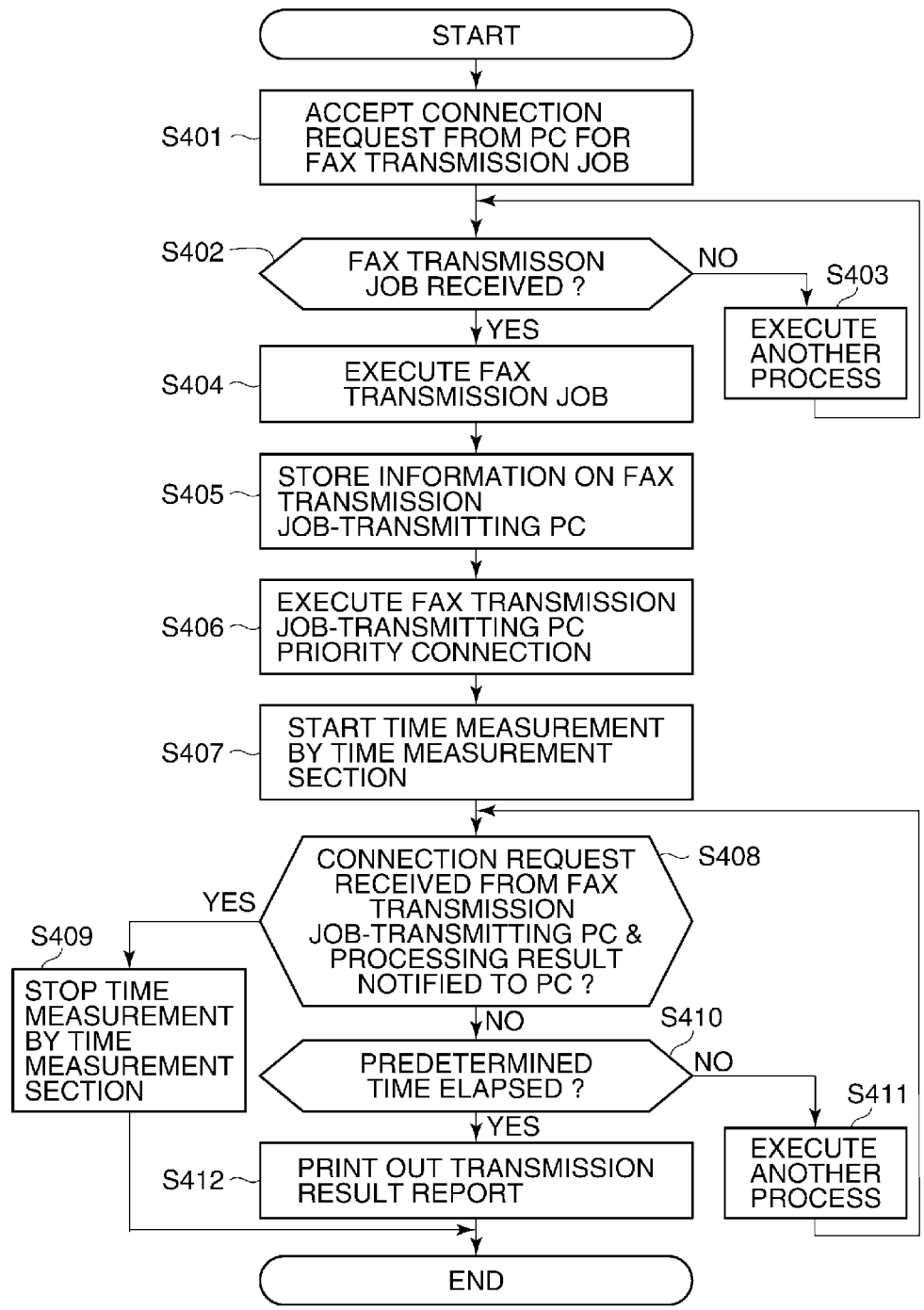

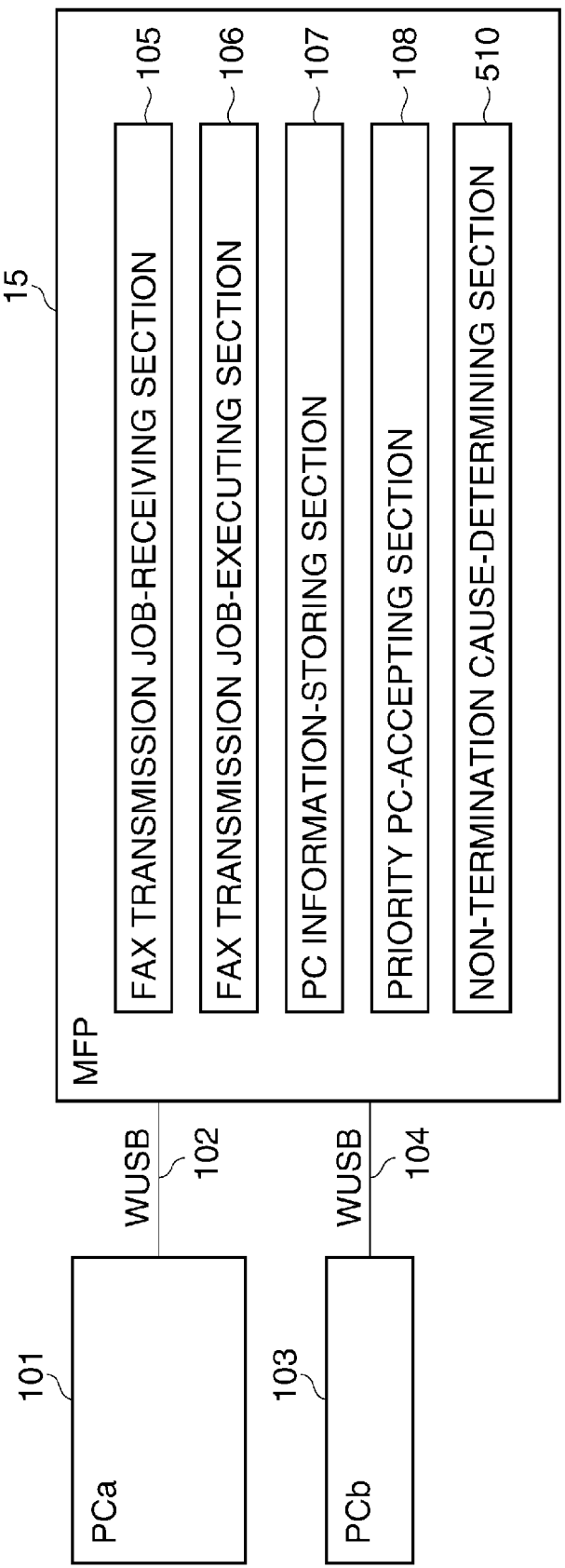

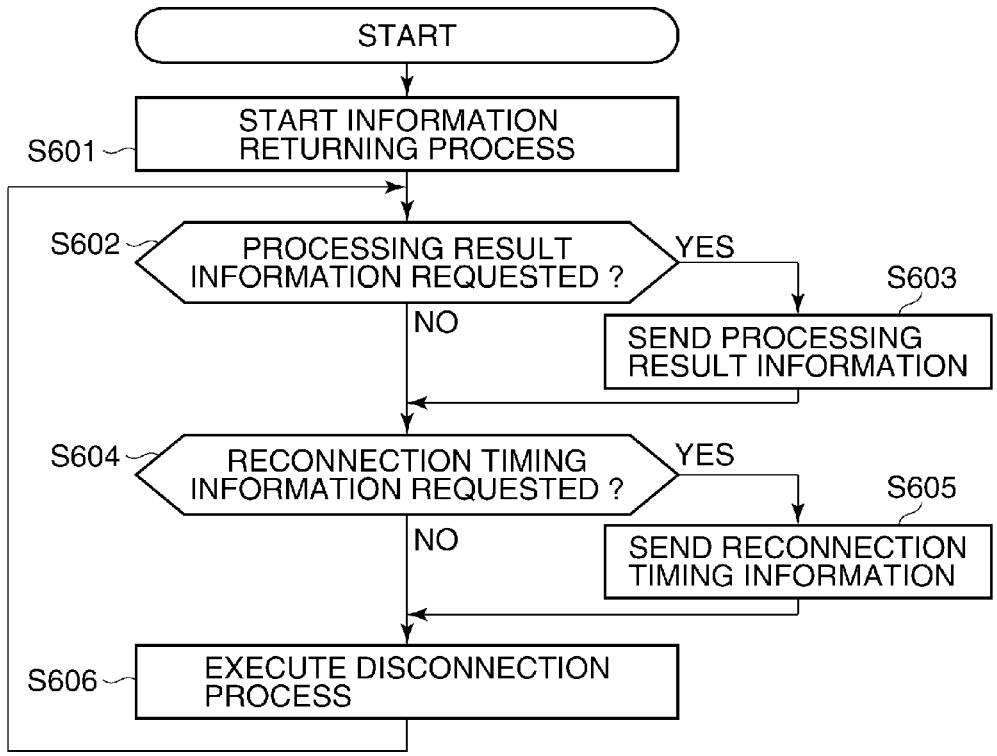
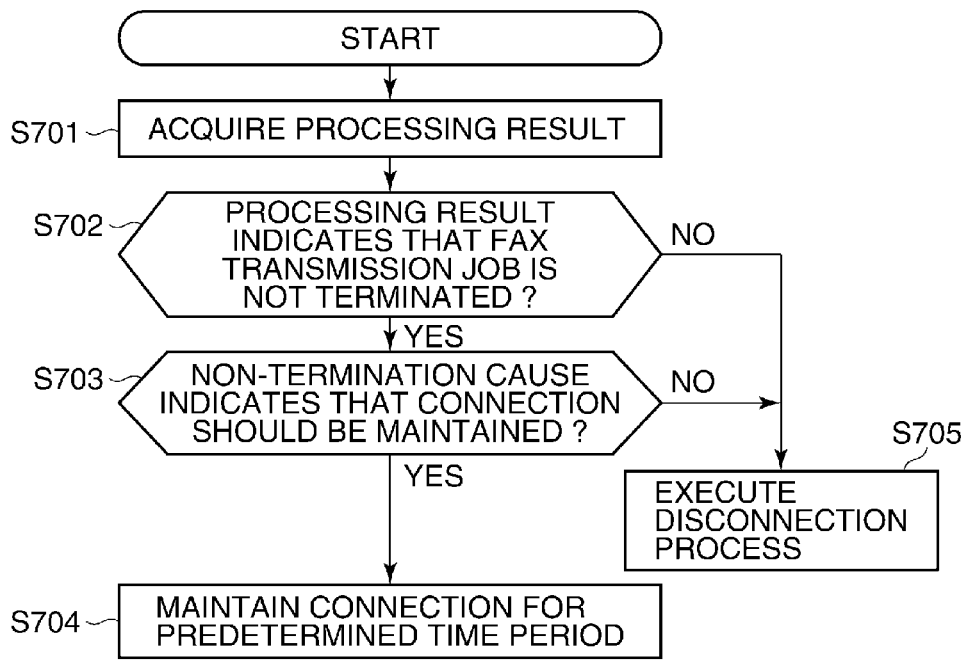

COMMUNICATION APPARATUS USING RECONNECTION REQUEST, METHOD OF CONTROLLING THE SAME, AND STORAGE MEDIUM

BACKGROUND OF THE INVENTION

1. Field of the Invention

The present invention relates to a communication apparatus that is capable of performing wireless communication with a plurality of host computers, and a method of controlling the communication apparatus.

2. Description of the Related Art

Conventionally, as disclosed in Japanese Laid-Open Patent Publication No. 2007-251851, there has been proposed a wireless USB formed by making USB wireless which is one of standards used in a personal computer (PC) environment as an interface for connection to peripheral devices.

In the wireless USB communication, it is impossible for a plurality of host computers to simultaneously communicate with one MFP (Multi-Function Peripheral), but it only possible to perform communication between one host computer and one MFP. This is stipulated in the standard of wireless USB (Wireless USB Specification Rev. 1.0).

Now, a description will be given of the following situation, by way of an example, in an environment in which a plurality of host computers (PCa, PCb, PCc) and a communication apparatus (MFP) are capable of performing wireless USB communication.

First, the PCa requests the MFP to connect thereto, and the PCa and the MFP become connected to each other. Then, in response to a facsimile transmission request received from the PCa, the MFP performs facsimile transmission of data received from the PCa to another facsimile machine via a public communication line network. Then, after the processing of the facsimile transmission is completed, the MFP sends a processing result (success or failure of the transmission) to the PCa which is the sender of the request.

In performing such processing, however, there can arise the following problem: There is a case where the transmission rate of facsimile transmission from the MFP is much slower than the speed of data transmission from the PCa to the MFP. In this case, to confirm the result of facsimile transmission by the PCa, even though the data transmission from the PCa to the MFP has been completed, it is required to maintain the connection between the PCa and the MFP without performing disconnection until the facsimile transmission is completed. Therefore, this causes the MFP to be uselessly occupied by the PCa, so that users of the PCb and the PCc have to wait for a long time.

FIG. 18 is a schematic diagram useful in explaining the above-mentioned situation. When the MFP accepts a connection request (701) from the PCa, the MFP connects to the PCa, and receives a FAX transmission JOB from the PCa (702). Then, the MFP stores data received from the PCa in an image memory thereof, and performs facsimile transmission of the data to a destination receiver via the public communication line network by controlling a modem thereof.

The transmission rate of this facsimile transmission is specified in ITU-T recommendation V. 34 and T. 30, and is 33.6 kbps at the maximum. On the other hand, in the case of wireless USB communication, assuming that it is possible to obtain the same speed as that of USB 2.0, the transmission rate is 480 Mbps. As a consequence, after the transmission of the data in 702 is completed, the PCa and the MFP remain connected to each other until the processing of the facsimile transmission is completed.

Then, upon completion of the processing of the facsimile transmission, the MFP notifies the result of the transmission processing to the PCa (705), and then the PCa and the MFP are disconnected from each other (706). In other words, before the processing of the facsimile transmission is completed, it is impossible to accept the connection requests 703 and 704 from the PCb and the PCc which are the other host computers.

On the other hand, it can be envisaged to terminate the connection between the PCa and the MFP without waiting for completion of the facsimile transmission after the data transmission from the PCa to the MFP is completed. In this case, the PCa requests the MFP again to connect thereto (reconnection request), whereby the PCa and the MFP become connected to each other, and then the MFP notifies the result of the transmission processing to the PCa.

FIG. 19 is a schematic diagram useful in explaining a process for terminating the connection between the PCa and the MFP without waiting for completion of the facsimile transmission after the data transmission from the PCa to the MFP is completed. In response to a connection request (801) received from the PCa, the MFP connects to the PCa and receives a FAX transmission JOB from the PCa (802). Then, the MFP stores data received from the PCa in the image memory, and performs facsimile transmission of the data to the destination receiver via the public communication line network by controlling the modem.

In this case, differently from the FIG. 18 case, the MFP notifies predetermined information (e.g. receipt number) to the PCa (803), and terminates the connection to the PCa without waiting for completion of the processing of the facsimile transmission (804). Therefore, if the PCb, for example, requests the MFP to connect thereto (805) and requests the MFP to execute a printing process (806), the MFP can execute the printing process by controlling a recording section thereof. Further, if the PCc, for example, requests the MFP to connect thereto (809) and requests the MFP to execute a scanning process (810), the MFP can execute the scanning process by controlling a scanner thereof.

However, in this case, even if the PCa requests a reconnection so as to confirm the transmission result, if the MFP is in a state connected to the other host computer (PCb or PCc), the PCa cannot be connected to the MFP, and hence it takes a long time before confirming the transmission result. That is, even if the PCa requests a reconnection in 807, since the MFP has been connected to the PCb, the MFP cannot connect to the PCa. Similarly, even if the PCa requests a reconnection in 811, since the MFP has been connected to the PCc, the MFP cannot connect to the PCa. That is, this causes a problem that the PCa cannot confirm the transmission result until the MFP and the PCb are disconnected (808) and further the MFP and the PCc are disconnected (813).

SUMMARY OF THE INVENTION

The present invention provides a communication apparatus and a method of controlling the communication apparatus which make it possible to prevent the communication apparatus from being occupied by one host computer and enables the user of a host computer having sent a processing request to the communication apparatus to quickly know a processing result, and a computer-readable storage medium storing a program for causing a computer to execute the method.

In a first aspect of the present invention, there is provided a communication apparatus that is capable of performing wireless communication with a plurality of host computers, comprising an accepting unit adapted to accept a connection request from one host computer of the plurality of host computers, a processing unit adapted to connect to the host computer which has sent the connection request, in response to the connection request accepted by the accepting unit, and execute a process requested by the connected host computer, a storing unit adapted to store information indicative of the connected host computer, and a control unit adapted to perform control such that the accepting unit accepts a reconnection request from the host computer indicated by the information stored by the storing unit, with priority over connection requests from other host computers.

In a second aspect of the present invention, there is provided a method of controlling a communication apparatus that is capable of performing wireless communication with a plurality of host computers, comprising accepting a connection request from one host computer of the plurality of host computers, connecting to the host computer which has sent the connection request, in response to the connection request accepted by the accepting, and executing a process requested by the connected host computer, storing information indicative of the connected host computer, and performing control such that a reconnection request from the host computer indicated by the information stored by the storing is accepted with priority over connection requests from other host computers.

In a third aspect of the present invention, there is provided a computer-readable storage medium storing a program for causing a computer to execute a method of controlling a communication apparatus that is capable of performing wireless communication with a plurality of host computers, wherein the method comprises accepting a connection request from one host computer of the plurality of host computers, connecting to the host computer which has sent the connection request, in response to the connection request accepted by the accepting, and executing a process requested by the connected host computer, storing information indicative of the connected host computer, and performing control such that a reconnection request from the host computer indicated by the information stored by the storing is accepted with priority over connection requests from other host computers.

According to the present invention, it is possible to prevent the communication apparatus from being occupied by one host computer and enables the user of the host computer having sent a processing request to the communication apparatus to quickly know the processing result.

Further features of the present invention will become apparent from the following description of exemplary embodiments with reference to the attached drawings.

BRIEF DESCRIPTION OF THE DRAWINGS

FIG. 9 is a flowchart of a FAX transmission JOB-transmitting PC priority reconnection process executed by the MFP which is the communication apparatus according to the fourth embodiment.

FIG. 10 is a diagram showing the software configuration of an MFP which is a communication apparatus according to a fifth embodiment of the present invention.

FIG. 12 is a flowchart of an information returning process executed by the MFP which is the communication apparatus according to the fifth embodiment.

FIG. 13 is a flowchart of a process executed by the MFP which is the communication apparatus according to the fifth embodiment, when the FAX transmission JOB is not terminated.

DETAILED DESCRIPTION OF THE EMBODIMENTS

The present invention will now be described in detail below with reference to the accompanying drawings showing embodiments thereof. It should be noted that the present invention is not limited to the embodiment described below, and not all combinations of features described in the present embodiment are essential to a solution of the present invention.

Figure 1:
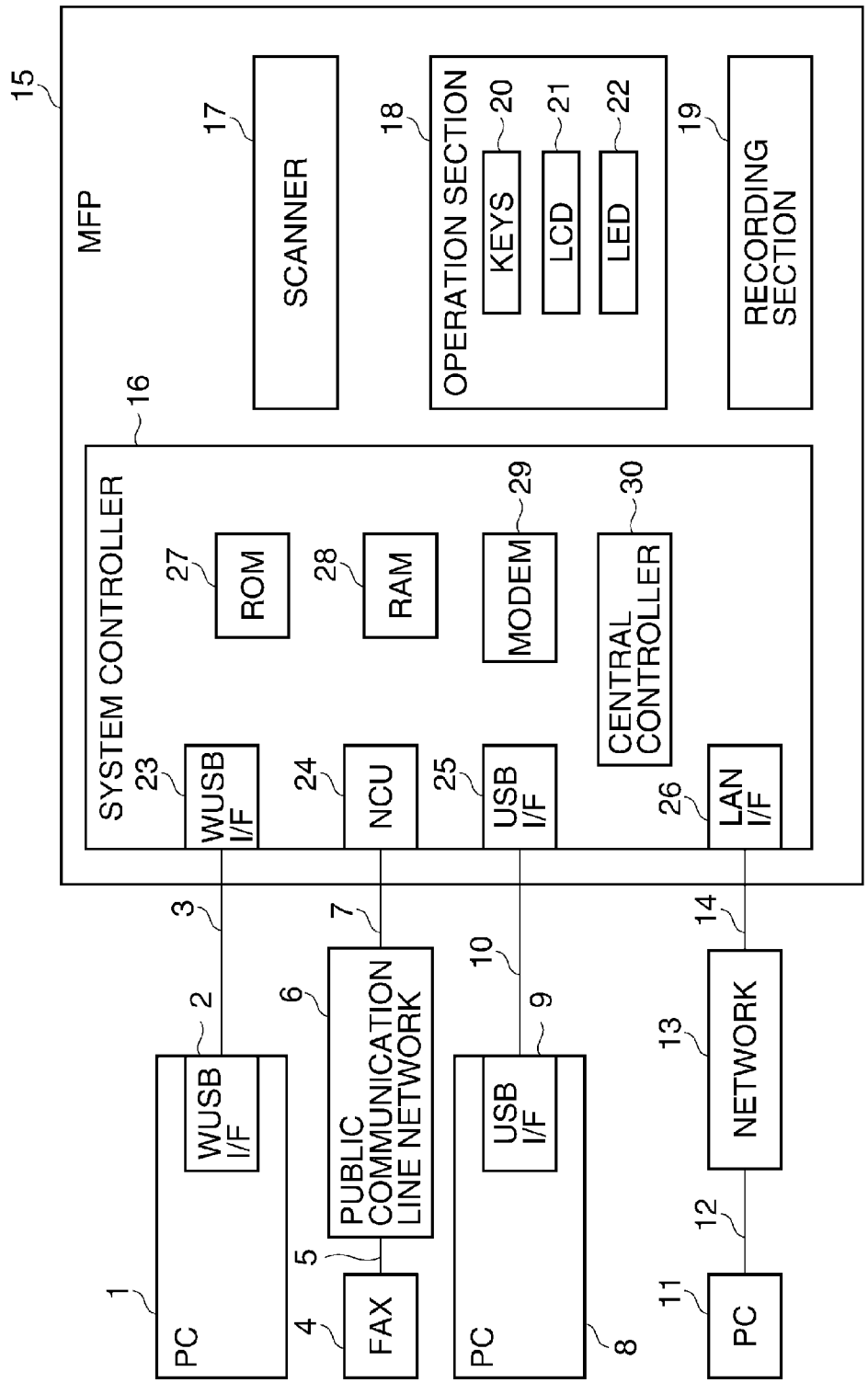
FIG. 1 is a block diagram of a system in its entirety including an MFP which is a communication apparatus according to a first embodiment.

FIG. 1 is a block diagram useful in explaining the configuration of an MFP (Multi-Function Peripheral) 15 which is an example of a communication apparatus, and a system in its entirety including a PC (Personal Computer) as an example of a host computer that is capable of performing wireless USB communication with the MFP 15.

A PC 1 is provided with a WUSBIF (Wireless USB Interface) 2, and connects to the MFP 15 via a wireless communication channel 3 used in performing WUSB communication. A FAX (facsimile machine) 4 connects to the MFP 15 via communication lines 5 and 7, each implemented by a cable or the like, and a public communication line network 6, and performs facsimile communication with the MFP 15. A PC 8 is provided with a USBIF 9, and connects to the MFP 15 via a wired USB cable 10. A PC 11 connects to the MFP 15 via network cables 12 and 14 and a network 13.

The MFP 15 is comprised of a system controller 16, a scanner 17, an operation section 18, and a recording section 19.

The system controller 16 controls the overall operation of the MFP 15. The scanner 17 scans an image on an original to thereby create image data. The operation section 18 accepts operation inputs by a user. A key 20 is operated by the user. An LCD (Liquid Crystal Display) 21 is displays an operation screen. An LED 22 displays various kinds of information of the apparatus to the user. The recording section 19 prints out the image based on the image data on a recording medium, and further prints out various kinds of reports including a processing result report.

A WUSBIF 23 controls WUSB communication with the PC 1 via the wireless communication channel 3. An NCU (Network Control Unit) 24 controls facsimile communication with the FAX 4 via the public communication line network 6. A USBIF 25 controls wired USB communication with the PC 8 via the wired USB cable 10. An LANIF (Local Area Network Interface) 26 controls data communication with the PC 11 via the network 13.

The system controller 16 is further provided with a ROM (Read Only Memory) 27 that stores programs and the like for determining operations of the MFP 15, a RAM (Radom Access Memory) 28 that is capable of storing image data and the like, a modem 29 that controls execution of facsimile communication, and a central controller 30.

It is assumed that the respective basic configurations of the MFP 15 and the PCs 1, 8, and 11 described above as an example of the communication apparatus according to the first embodiment and examples of the host computer are also the same in respective descriptions of other embodiments, given hereinafter, and hence detailed description of the basic configurations will be omitted in the description of each of the other embodiments.

Figure 2:
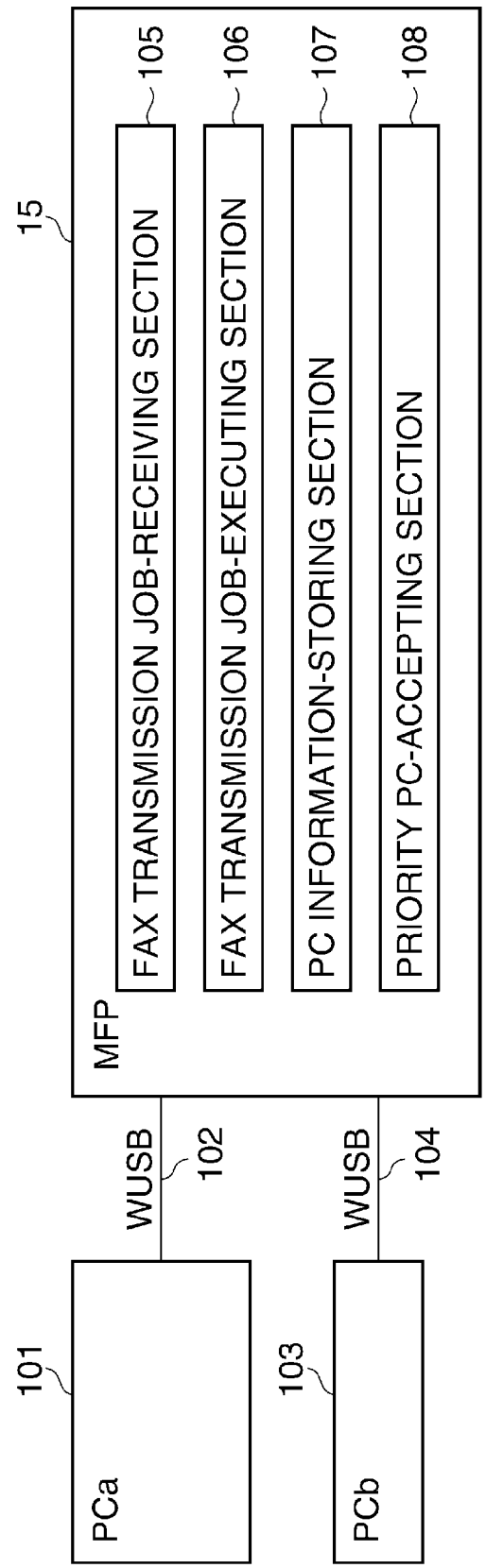
FIG. 2 is a diagram showing the software configuration of the MFP in FIG. 1.

FIG. 2 is a diagram showing the software configuration of the MFP 15 which is the communication apparatus according to the first embodiment. The functions indicated within the MFP 15 are realized by executing a control program by the central controller 30 of the MFP 15. Further, a PCa 101 and a PCb 103 are the same as the PC1 illustrated in FIG. 1, and are capable of performing WUSB communication with the MFP 15 via wireless communication channels 102 and 104, respectively. Although the wireless communication channels 102 and 104 are schematically illustrated as separate ones, actually, both of the communication channels are established by the WUSBIF 23.

In response to a connection request from a PC, the MFP 15 connects to the connection requesting PC, and then a FAX transmission JOB-receiving section 105 receives a FAX transmission JOB from the PC. By transmitting the FAX transmission JOB to the MFP 15, the PC can request the MFP 15 to execute facsimile transmission to the FAX 4. A FAX transmission JOB-executing section 106 executes the FAX transmission JOB received by the FAX transmission JOB-receiving section 105 to thereby transmit facsimile data.

A PC information-storing section 107 stores information indicative of a PC that was connected to the MFP 15 and transmitted the FAX transmission JOB. Further, a priority PC-accepting section 108 performs control for preferentially accepting a reconnection request from the PC indicated by the information stored by the PC information-storing section 107, by a method described hereinafter.

Figure 3:
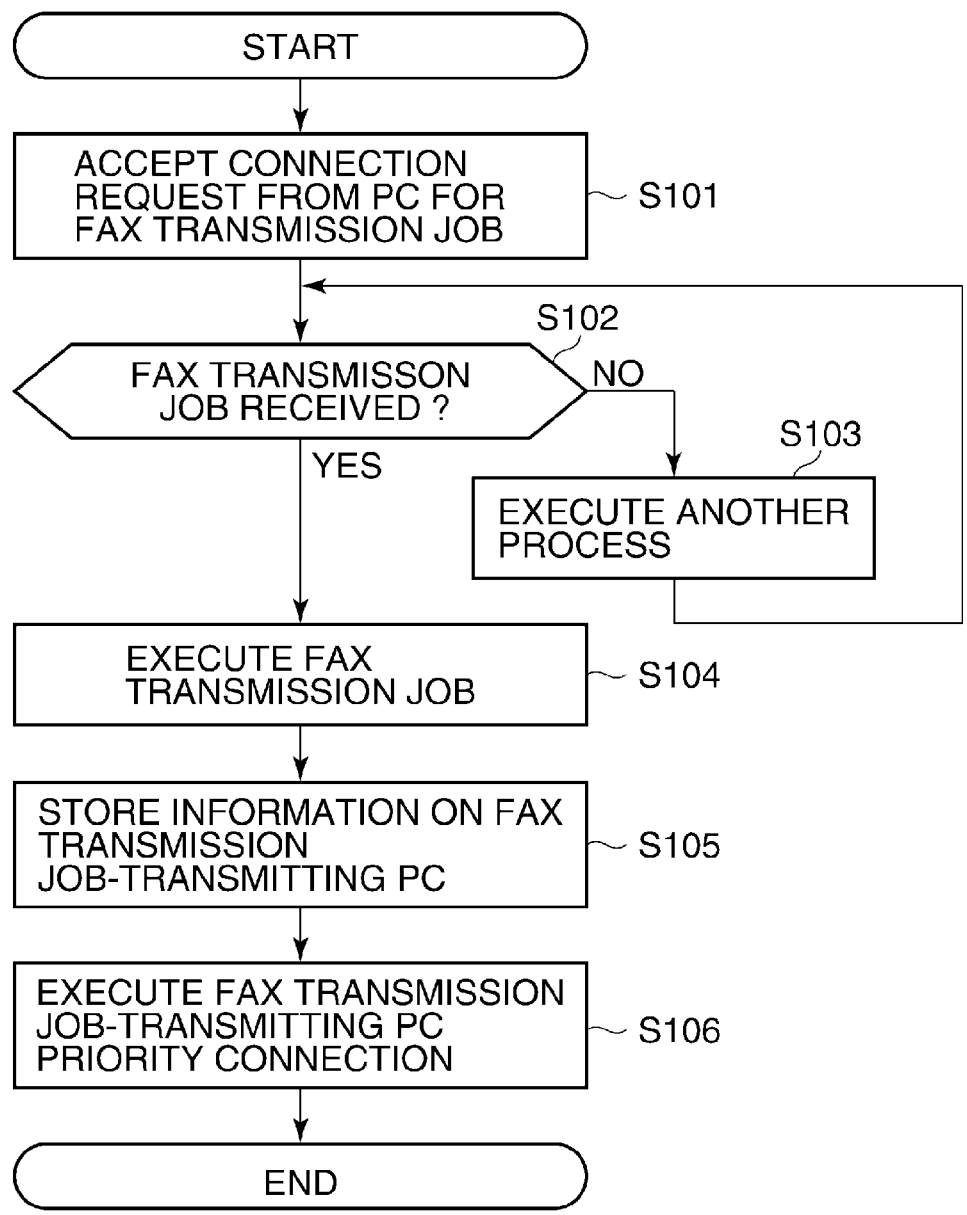
FIG. 3 is a flowchart of a FAX transmission JOB-transmitting PC priority connection process executed by the MFP which is the communication apparatus according to the first embodiment.

FIG. 3 is a flowchart of a FAX transmission JOB-transmitting PC priority connection process executed by the MFP 15 which is the communication apparatus according to the present embodiment.

In a step S101, a connection request from a PC (PCa 101 or PCb 103) for a FAX transmission JOB is accepted.

In a step S102, in response to the connection request from the PCa 101 or the PCb 103, the MFP 15 connects to the PC which is the connection requesting PC, and it is determined whether or not the FAX transmission JOB is received from the PC to which the MFP 15 has connected. If the FAX transmission JOB is received, the process proceeds to a step S104, whereas if not, the process proceeds to a step S103, wherein a process requested by the PC to which the MFP 15 has connected (printing process or scanning process) is executed.

In the step S104, the FAX transmission JOB received by the FAX transmission JOB-receiving section 105 is executed by the FAX transmission JOB-executing section 106. Then, in a step S105, information indicative of the PC which has transmitted the FAX transmission JOB, i.e. the PC connected to the MFP 15 is stored by the PC information-storing section 107. Then, in a step S106, the priority PC-accepting section 108 performs control such that the reconnection request from the PC indicated by the information stored by the PC information-storing section 107 is accepted with priority over requests from the other PCs.

The process for preferentially accepting a reconnection request is intended to mean a process for accepting a connection request from a PC indicated by information stored by the PC information-storing section 107, in a case where, for example, connection requests are received from a plurality of PCs. The process is also intended to mean a process for disconnecting another PC which has been connected, in a case where a connection request i.e. a reconnection request is received from the PC indicated by the information stored by the PC information-storing section 107.

After connecting to the PC in response to the reconnection request from the PC indicated by the information stored by the PC information-storing section 107, the MFP 15 notifies a result of the facsimile transmission processing (success or failure of the transmission) executed by the transmission JOB-executing section 106 to the PC to which the MFP 15 has connected.

As described above, according to the present embodiment, it is possible to prevent the MFP from being occupied by one host computer, and the user of a host computer which has sent a processing request to the communication apparatus can quickly know a result of processing.

Figure 4:
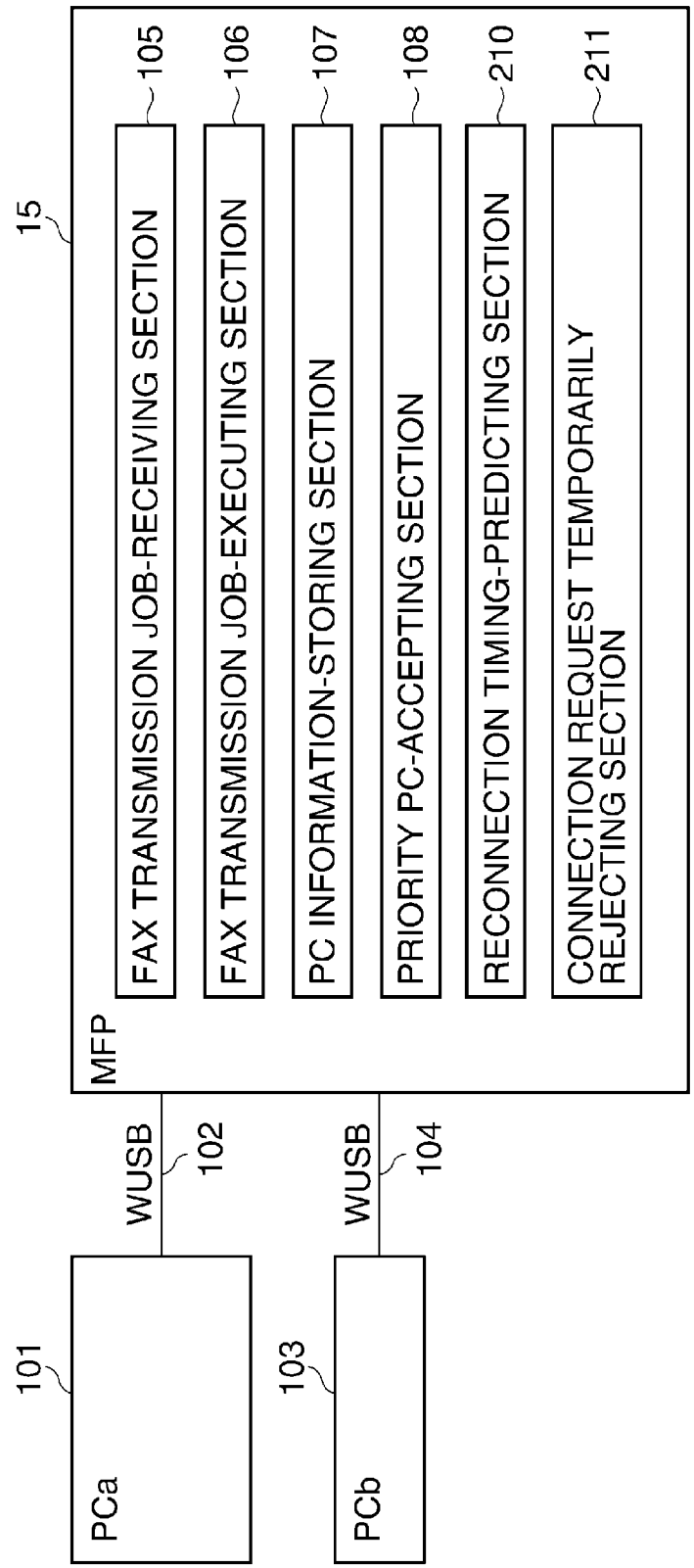
FIG. 4 is a diagram showing the software configuration of an MFP which is a communication apparatus according to a second embodiment of the present invention.

FIG. 4 is a diagram showing the software configuration of the MFP 15 which is a communication apparatus according to a second embodiment of the present invention. The functions indicated within the MFP 15 are realized by executing a control program by the central controller 30 of the MFP 15. Component elements identical to those shown in FIG. 2 are denoted by the same reference numerals, and detailed description thereof is omitted.

A reconnection timing-predicting section 210 predicts timing in which a PC connected to the MFP 15 sends a connection request again after transmitting a FAX transmission JOB and once disconnecting the connection, so as to confirm the result of the facsimile transmission processing executed by the MFP 15. More particularly, the reconnection timing-predicting section 210 predicts a time period required for completing facsimile transmission processing based on the received contents of the FAX transmission JOB (e.g. the number of pages to be transmitted). Then, before disconnecting the connection after receiving the FAX transmission JOB from the PC, the reconnection timing-predicting section 210 notifies the PC of the predicted time period. This makes it possible to predict that the PC sends a reconnection request upon the lapse of the notified time period.

A connection request temporarily rejecting section 211 temporarily rejects the connection requests from the other PCs according to an instruction from the priority PC-accepting section 108 so as to accept the reconnection request from the PC indicated by the information stored by the PC information-storing section 107 with priority over the connection requests from the other PCs.

Figure 5:
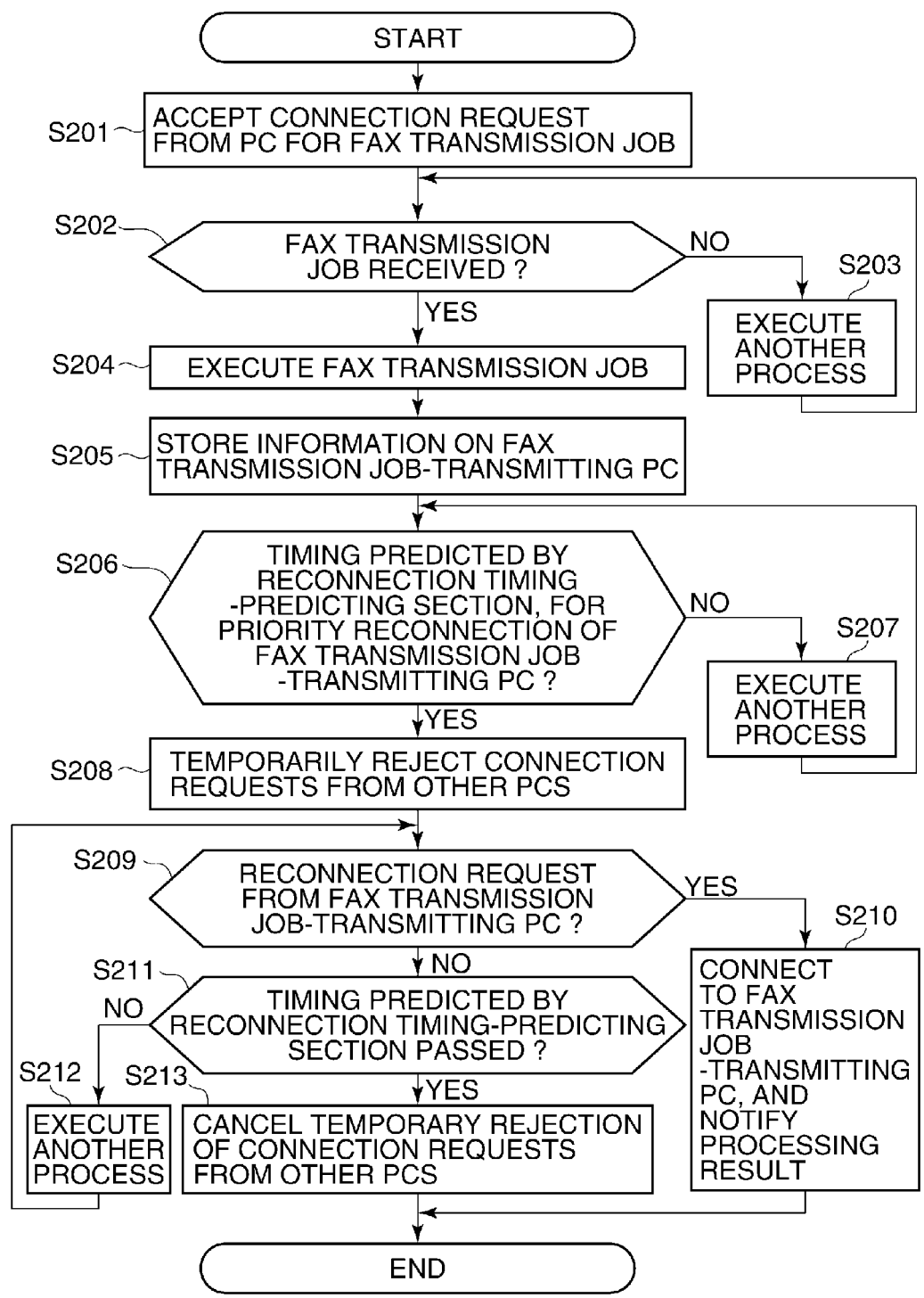
FIG. 5 is a flowchart of a FAX transmission JOB-transmitting PC priority reconnection process executed by the MFP which is the communication apparatus according to the second embodiment.

FIG. 5 is a flowchart of a FAX transmission JOB-transmitting PC priority reconnection process executed by the MFP 15 which is the communication apparatus according to the present embodiment. The operations performed by the MFP 15 correspond to the respective steps (indicated by S) in the flowchart.

In a step S201, a connection request from a PC for a FAX transmission JOB is accepted.

In a step S202, in response to the connection request from the PCa 101 or the PCb 103, the MFP 15 connects to the PC which is the connection requesting PC, and it is determined whether or not a FAX transmission JOB is received from the PC to which the MFP 15 has connected. If the FAX transmission JOB is received, the process proceeds to a step S204, whereas if not, the process proceeds to a step S203, wherein a process requested by the PC to which the MFP 15 has connected (printing process or scanning process) is executed.

In the step S204, the FAX transmission JOB-executing section 106 executes the FAX transmission JOB received by the FAX transmission JOB-receiving section 105. Then, in a step S205, information indicative of the PC which has transmitted the FAX transmission JOB, i.e. the PC which is connected to the MFP 15 is stored by the PC information-storing section 107.

In a step S206, it is determined whether or not it is timing predicted by the reconnection timing-predicting section 210, i.e. whether or not it is timing in which a reconnection request is to be received from the PC which was once disconnected after transmitting the FAX transmission JOB. If it is determined that it is not the timing predicted by the reconnection timing-predicting section 210, the process proceeds to a step S207, wherein another process is executed. That is, in this case, instead of executing the process for accepting the reconnection request from the PC indicated by the information stored by the PC information-storing section 107 with priority over the connection requests from the other PCs, connection requests from any other PCs are equally accepted.

If it is determined that it is the timing predicted by the reconnection timing-predicting section 210, the process proceeds to a step S208, wherein the process for temporarily rejecting connection requests from the PCs other than the PC indicated by the information stored by the PC information-storing section 107 is executed by the connection request temporarily rejecting section 211.

In a step S209, it is determined whether or not a connection request is received from the PC indicated by the information stored by the PC information-storing section 107. If the connection request is received, the process proceeds to a step S210, wherein the MFP 15 connects to the PC which is the connection requesting PC, and notifies the result (success or failure of the transmission) of the facsimile transmission processing executed by the transmission JOB-executing section 106 to the PC to which the MFP 15 has connected, followed by terminating the present process.

On the other hand, if the connection request is not received, the process proceeds to a step S211, wherein it is determined whether or not the timing predicted by the reconnection timing-predicting section 210 has passed. If it is determined that the timing predicted by the reconnection timing predicting section 210 has passed, the rejection of the connection requests by the connection request temporarily rejecting section 211 is canceled (S213), followed by terminating the present process. On the other hand, if the timing predicted by the reconnection timing-predicting section 210 has not passed yet, another process is executed in a step S212 while continuing the rejection of connection requests by the connection request temporarily rejecting section 211, and the connection request from the PC indicated by the information stored by the PC information-storing section 107 is awaited.

As described above, according to the present embodiment, the process for preferentially accepting a reconnection request from a host computer having sent a processing request is not executed until predicted timing comes in which the reconnection request is to be received from the host computer having sent the processing request. This increases opportunities in which the other host computers can be connected to the communication apparatus (MFP 15).

Figure 6:
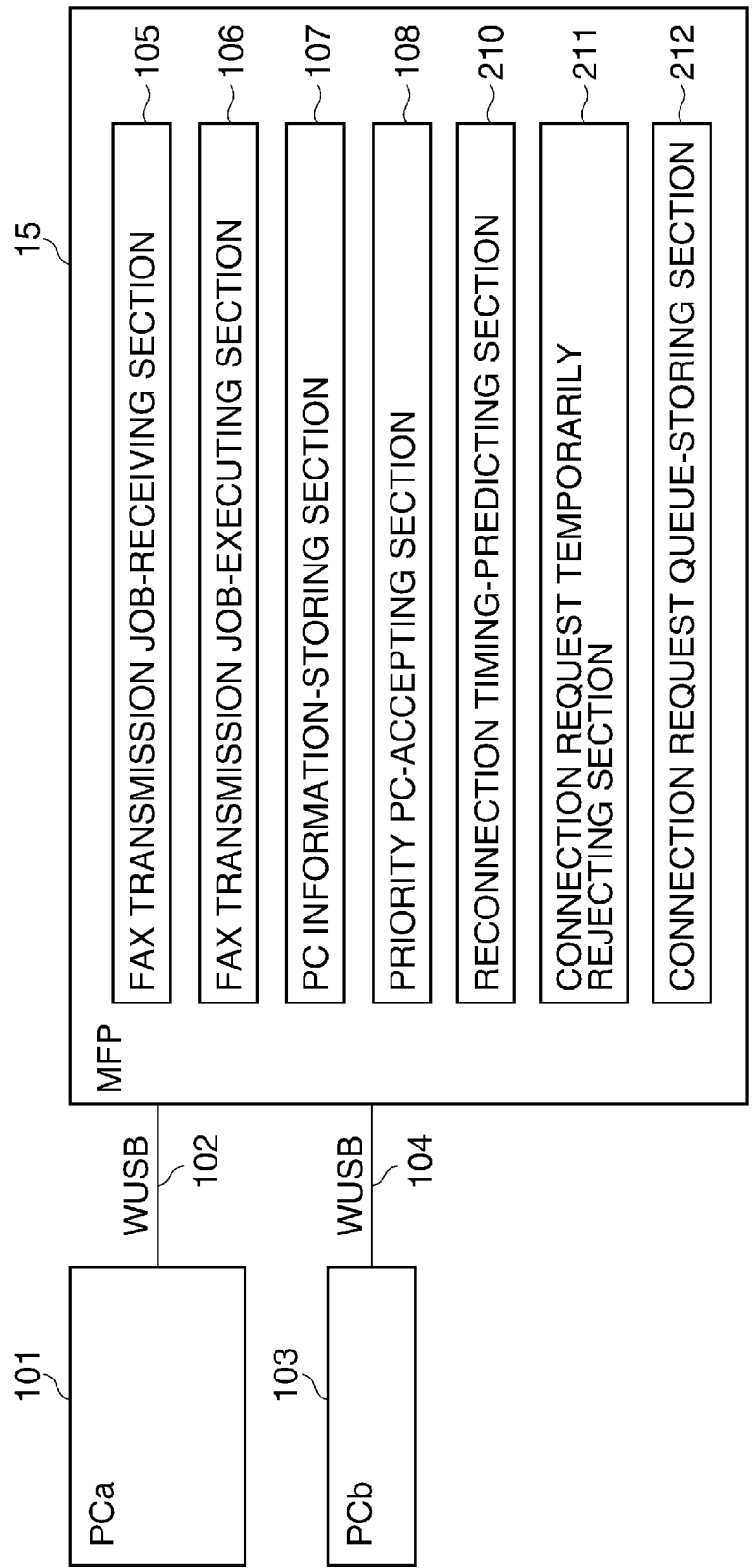
FIG. 6 is a diagram showing the software configuration of an MFP which is a communication apparatus according to a third embodiment of the present invention.

FIG. 6 is a diagram showing the software configuration of the MFP 15 which is a communication apparatus according to a third embodiment of the present invention. The functions indicated within the MFP 15 are realized by executing a control program by the central controller 30 of the MFP 15. Component elements identical to those shown in FIGS. 2 and 4 are denoted by the same reference numerals, and detailed description thereof is omitted.

A connection request queue-storing section 212 controls information indicative of a PC which has sent a connection request to the MFP 15, out of PCs (PCa 101 and PCb 103, or other PCs) which can be communicated with the MFP 15, as a queue. That is, in the WUSB communication, it is impossible to simultaneously connect the MFP to a plurality of PCs in parallel, and hence if connection requests are received from other PCs during connection of the MFP 15 to one PC, the connection requests are managed as a queue, whereby as soon as the preceding connection is disconnected, the MFP 15 connects to a first one of the other PCs in queue.

Figure 7:
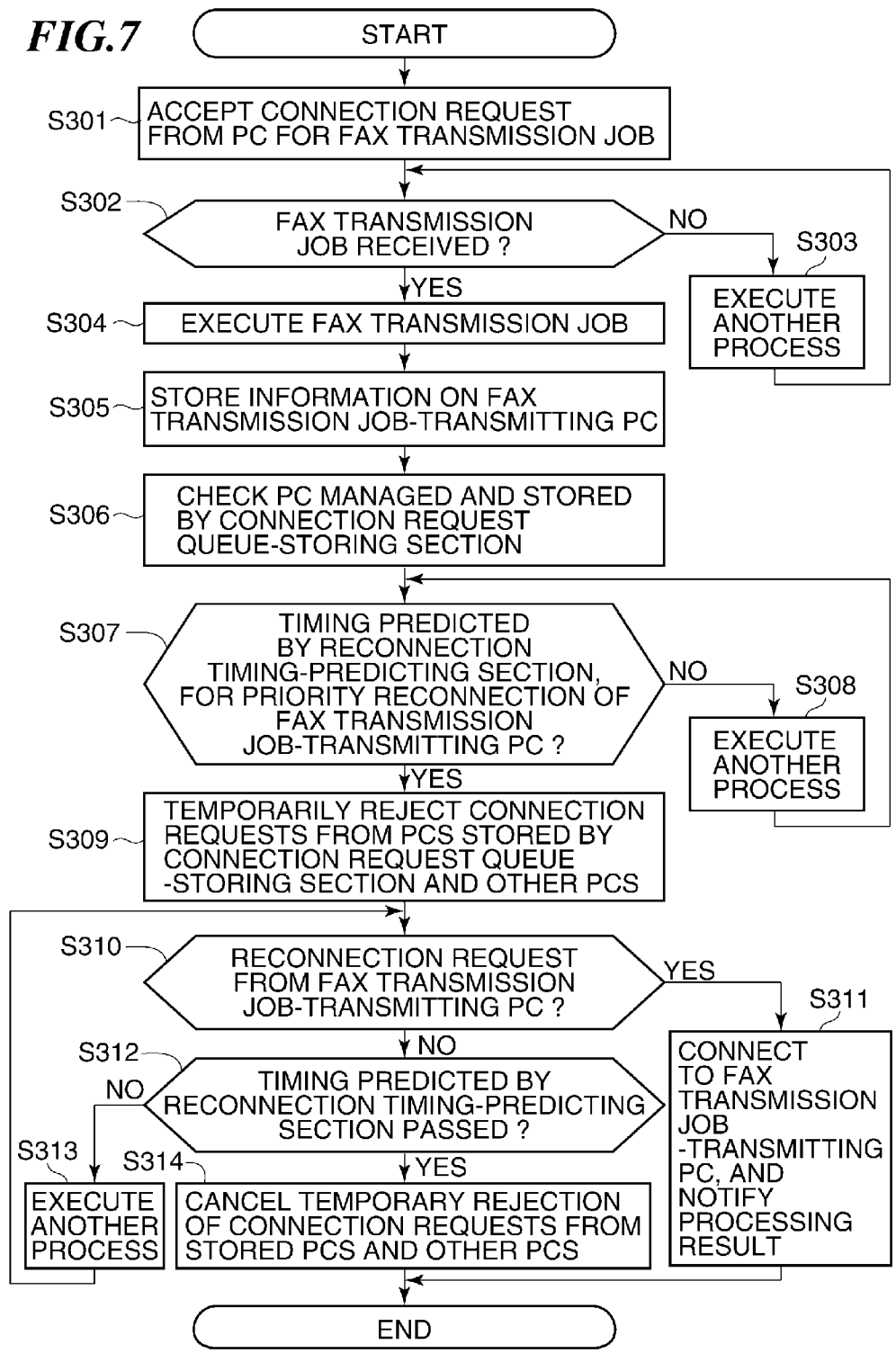
FIG. 7 is a flowchart of a FAX transmission JOB-transmitting PC priority reconnection process executed by the MFP.

FIG. 7 is a flowchart of a FAX transmission JOB-transmitting PC priority reconnection process executed by the MFP 15 which is the communication apparatus according to the present embodiment.

In a step S301, a connection request from a PC for a FAX transmission JOB is accepted.

In a step S302, in response to the connection request from the PCa 101 or the PCb 103, the MFP 15 connects to the PC which is the connection requesting PC, and it is determined whether or not the FAX transmission JOB is received from the PC to which the MFP 15 has connected. If the FAX transmission JOB is received, the process proceeds to a step S304, whereas if not, the process proceeds to a step S303, wherein a process requested by the PC to which the MFP 15 has connected (printing process or scanning process) is executed.

In the step S304, the FAX transmission JOB-executing section 106 executes the FAX transmission JOB received by the FAX transmission JOB-receiving section 105. Then, in a step S305, information indicative of the PC which has transmitted the FAX transmission JOB, i.e. the PC which is connected to the MFP 15 is stored by the PC information-storing section 107.

In a step S306, the PCs managed by the connection request queue-storing section 212 are checked (confirmed). Then, in a step S307, it is determined whether or not it is timing predicted by the reconnection timing-predicting section 210, i.e. whether or not it is timing in which a reconnection request is to be received from the PC which was once disconnected after transmitting the FAX transmission JOB.

If it is determined that it is not the timing predicted by the reconnection timing-predicting section 210, the process proceeds to a step S308, wherein another process is executed. That is, in this case, if there is a PC under management of the connection request queue-storing section 212, the MFP 15 connects to the PC. Further, if there is no PC under management of the connection request queue-storing section 212, without executing the process for accepting the reconnection request from the PC indicated by the information stored by the PC information-storing section 107 with priority over the connection requests from the other PCs, connection requests from any other PCs are equally accepted.

If it is determined that it is the timing predicted by the reconnection timing-predicting section 210, the process proceeds to a step S309, wherein the connection request temporarily rejecting section 211 executes the process for temporarily rejecting the connection requests from the PCs other than the PC indicated by the information stored by the PC information-storing section 107. Further, in this case, even if there is a PC managed by the connection request queue-storing section 212, the MFP 15 does not connect to this PC, but waits for the reconnection request to be received from the PC indicated by the information stored by the PC information-storing section 107.

In a step S310, it is determined whether or not the connection request is received from the PC indicated by the information stored by the PC information-storing section 107. If the connection request is received, the process proceeds to a step S311, wherein the MFP 15 connects to the PC which is the connection requesting PC, and notifies the result (success or failure of the transmission) of the facsimile transmission processing executed by the FAX transmission JOB-executing section 106 to the PC to which the MFP 15 has connected.

On the other hand, if the corresponding connection request is not received, the process proceeds to a step S312, wherein it is determined whether or not the timing predicted by the reconnection timing-predicting section 210 has passed. If it is determined that the timing predicted by the reconnection timing-predicting section 210 has passed, the rejection of the connection requests by the connection request temporarily rejecting section 211 is cancelled (S314), followed by terminating the present process. It should be noted that if there is a PC managed by the connection request queue-storing section 212 at this time, the MFP 15 connects to the PC.

On the other hand, if the timing predicted by the reconnection timing-predicting section 210 has not passed, the MFP 15 executes another process in a step S313 while continuing the rejection of the connection requests by the connection request temporarily rejecting section 211, and awaits the connection request from the PC indicated by the information stored by the PC information-storing section 107.

As described above, according to the present embodiment, if it is predicted timing in which a reconnection request is to be received from a host computer having sent a processing request, a connection request from another host computer is not accepted even if the connection request is sent from this host computer. More specifically, even if there is a PC managed by the connection request queue-storing section 212, the connection request from this PC is not accepted, but the connection request from the PC indicated by the information stored by the PC information-storing section 107 is awaited. This makes it possible to more quickly receive the connection request from the PC indicated by the information stored by the PC information-storing section 107.

Figure 8:
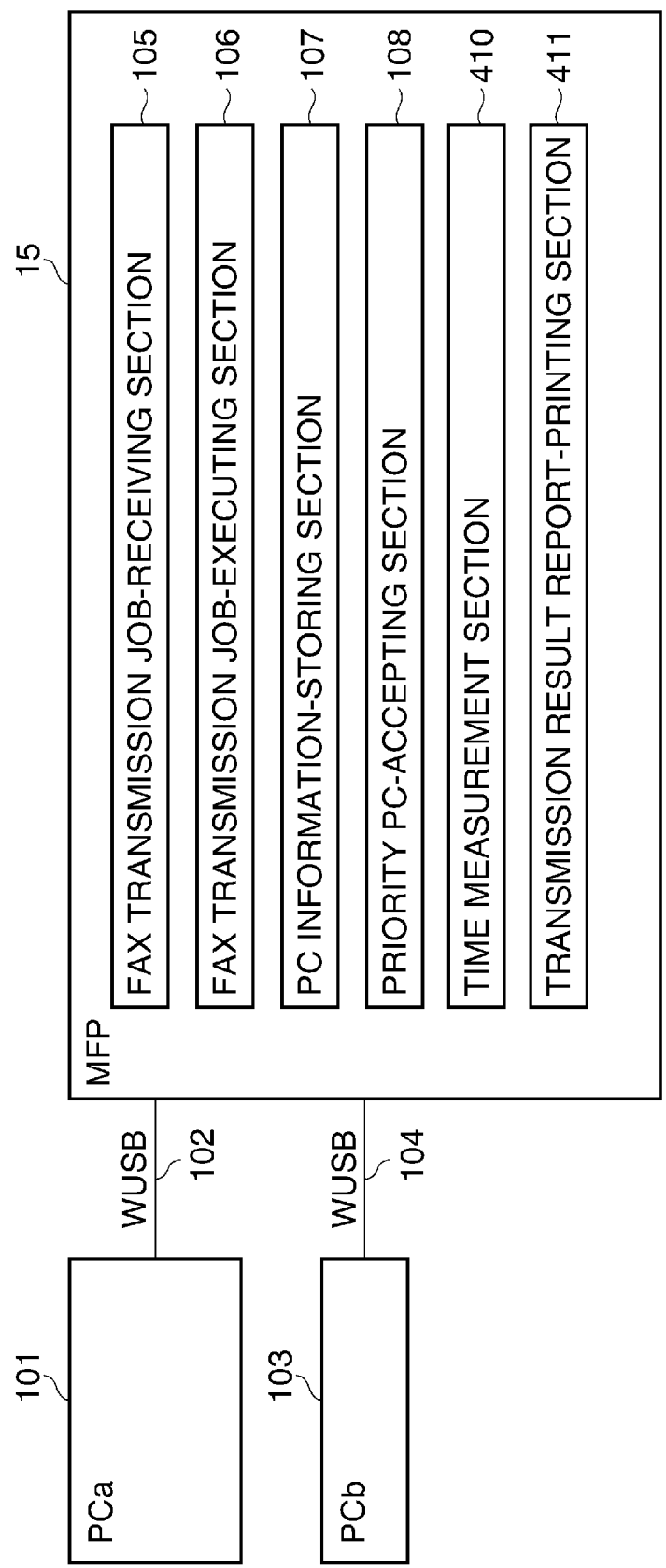
FIG. 8 is a diagram showing the software configuration of an MFP which is a communication apparatus according to a fourth embodiment of the present invention.

FIG. 8 is a diagram showing the software configuration of the MFP 15 which is a communication apparatus according to a fourth embodiment. The functions indicated within the MFP 15 are realized by executing a control program by the central controller 30 of the MFP 15. Component elements identical to those shown in FIG. 2 are denoted by the same reference numerals, and detailed description thereof is omitted.

A time measurement section 410 measures time elapsed after the FAX transmission JOB-receiving section 105 receives the FAX transmission JOB, or after the facsimile transmission processing performed by the FAX transmission JOB-executing section 106 is completed.

A transmission result report-printing section (printing section) 411 prints out a transmission result report indicative of a result of the facsimile transmission processing performed by the FAX transmission JOB-executing section 106 according to the result of time measurement by the time measurement section 410.

FIG. 9 is a flowchart of a FAX transmission JOB-transmitting PC priority reconnection process executed by the MFP which is the communication apparatus according to the present embodiment. Steps S401 to S406 are the same as the steps S101 to S106 described with reference to FIG. 3, and hence detailed description thereof is omitted.

In a step S407, time measurement is started by the time measurement section 410. The timing in which the time measurement is started may be when the FAX transmission JOB-receiving section 105 receives the FAX transmission JOB, or when the facsimile transmission processing executed by the FAX transmission JOB-executing section 106 is completed.

In a step S408, it is determined whether or not the connection request is received from the PC indicated by the information stored by the PC information-storing section 107 and the result (success or failure of the transmission) of the facsimile transmission processing executed by the FAX transmission JOB-executing section 106 is notified to the corresponding PC. If the processing result is received, the process proceeds to a step S409, wherein the time measurement performed by the time measurement section 410 is terminated.

On the other hand, if the processing result has not been received, the process proceeds to a step S410, wherein it is determined whether or not a predetermined time period has elapsed after the time measurement by the time measurement section 410 is started. If it is determined that the predetermined time period has elapsed, the process proceeds to a step S412, whereas if not, the process proceeds to a step S411. In the step S411, another process is executed while continuing the priority accepting process by the priority PC-accepting section 108, and the connection request from the PC indicated by the information stored by the PC information-storing section 107 is awaited.

In the step S412, the processing result (transmission result) report indicative of the result (success or failure of the transmission) of the facsimile transmission processing executed by the FAX transmission JOB-executing section 106 is printed out using the recording section 19, followed by terminating the priority accepting process executed by the priority PC-accepting section 108.

As described above, according to the present embodiment, if a predetermined time period has elapsed without accepting a reconnection request from the PC indicated by the information stored by the PC information-storing section 107, the report indicative of the result of processing executed by the FAX transmission JOB-executing section 106 is printed out. This makes it possible to prevent the possibility that a long time elapses without accepting the connection request from the PC indicated by the information stored by the PC information-storing section 107 while restricting the opportunities in which the other host computers can be connected to the MFP 15 during the time period.

FIG. 10 is a diagram showing the software configuration of the MFP 15 which is a communication apparatus according to a fifth embodiment of the present invention. The functions indicated within the MFP 15 are realized by executing a control program by the central controller 30 of the MFP 15. Component elements identical to those shown in FIG. 2 are denoted by the same reference numerals, and detailed description thereof is omitted.

If facsimile transmission processing executed by the FAX transmission JOB-executing section 106 has not been terminated when a reconnection request for confirming the processing result is received from a PC, a non-termination cause-determining section 510 determines the cause.

Figure 11A:
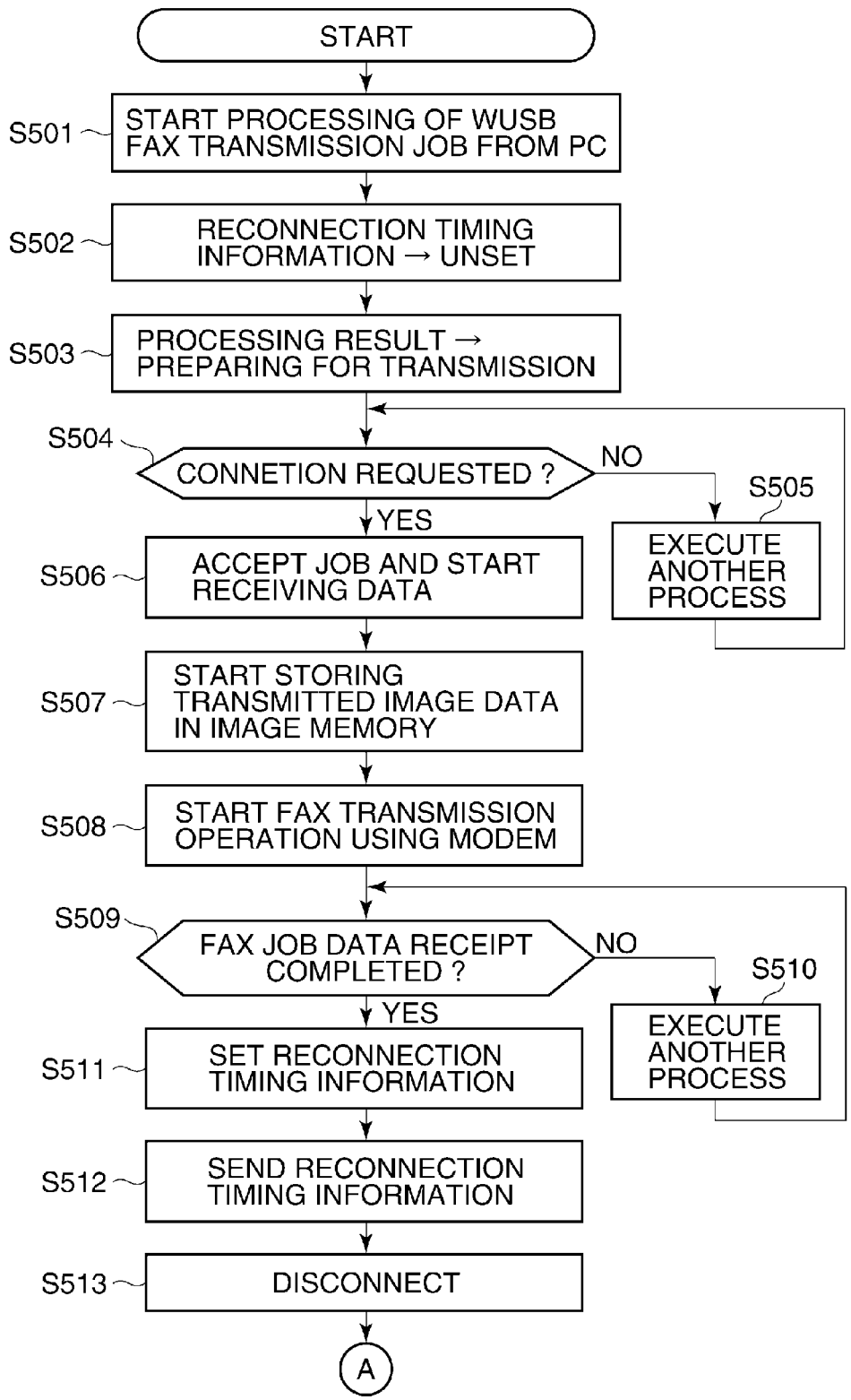
FIG. 11A is a flowchart of a FAX transmission process executed by the MFP which is the communication apparatus according to the fifth embodiment.
Figure 11B:
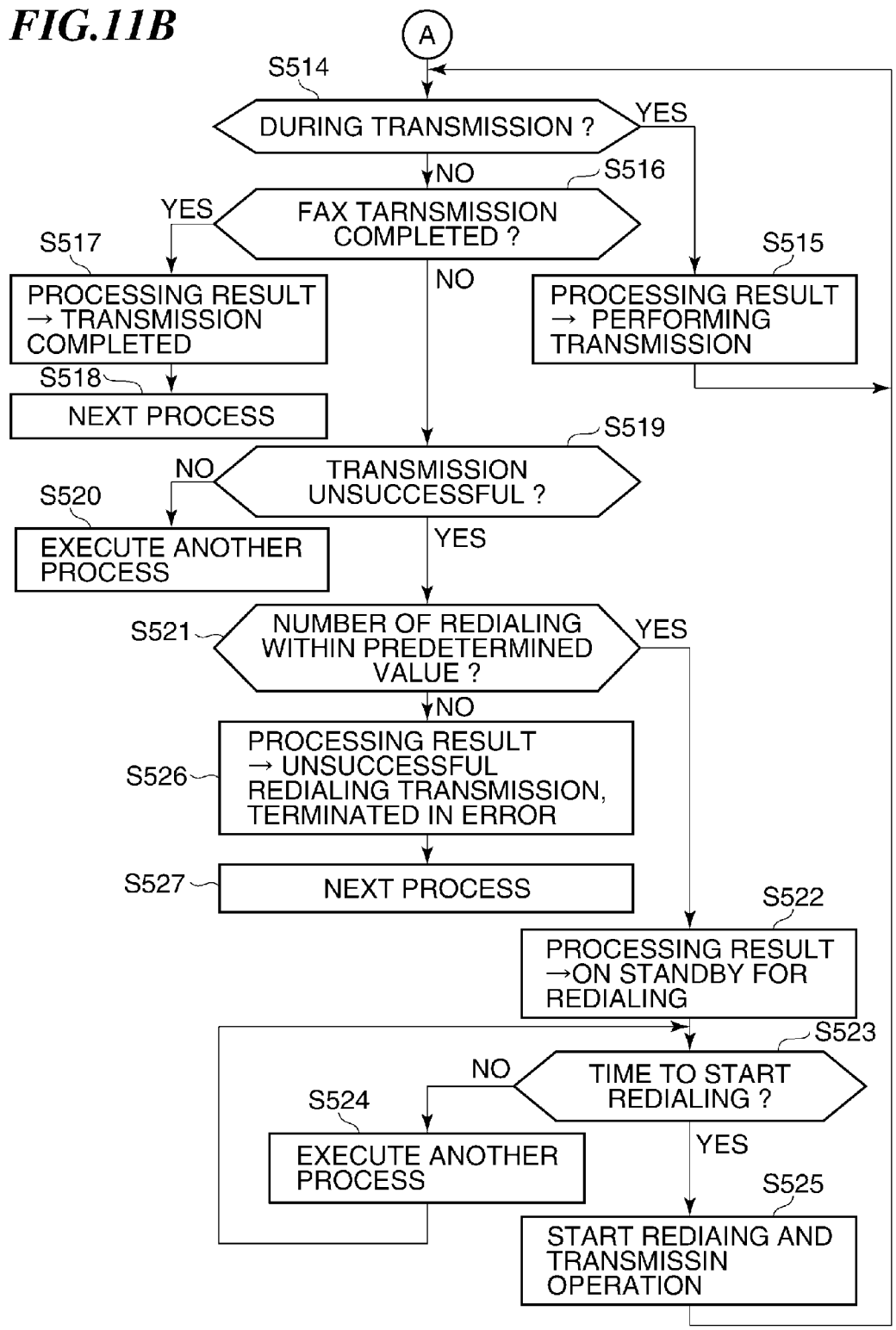
FIG. 11B is a continuation of FIG. 11A.

FIGS. 11A and 11B are a flowchart of a FAX transmission process executed by the MFP 15 (mainly the FAX transmission JOB-executing section 106) which is the communication apparatus according to the fifth embodiment.

In a step S501, a preliminary process for executing a FAX transmission JOB by the FAX transmission JOB-executing section 106 is started. In a step S502, reconnection timing in which a response to an inquiry from a PC is to be made is set to "unset". Further, in a step S503, a processing result to be sent as the response to the inquiry from the PC is set to "preparing for transmission".

In a step S504, it is determined whether or not a connection request is received from a PC, and if the connection request is received, the process proceeds to a step S506, whereas if not, the present process proceeds to a step S505, wherein another process is executed.

In the step S506, the MFP 15 connects to the PC which has sent the connection request, and the FAX transmission JOB-receiving section 105 starts to receive the FAX transmission JOB from the PC. Further, in a step S507, image data to be transmitted, which is contained in the FAX transmission JOB, is stored in the image memory. Then, in a step S508, the facsimile transmission using the modem 29 is started. That is, here, the processing of receiving the FAX transmission JOB and the processing of facsimile transmission are executed in parallel.

In a step S509, it is determined whether or not the receipt of the FAX transmission JOB is completed. If the receipt of the FAX transmission JOB is completed, the process proceeds to a step S511, whereas if not, the process proceeds to a step S510, wherein the receipt of the FAX transmission JOB is continued and another process is executed as required.

In the step S511, based on the contents of the received FAX transmission JOB (e.g. the number of pages), reconnection timing is set in which a response to the inquiry from the PC is to be made. Then, in a step S512, the reconnection timing set in the step S511 is notified to the PC to which the MFP 15 has connected. The PC notified of the reconnection timing is caused to send the reconnection request for confirming the processing result, at the notified reconnection timing. In a step S513 following the step 512, the PC is disconnected.

In a step S514, it is determined whether or not the facsimile data is being transmitted. If the facsimile data is being transmitted, the process proceeds to a step S515, wherein the processing result to be sent as a response to the inquiry from the PC is set to "performing transmission".

If the facsimile data is not being transmitted, the process proceeds to a step S516, wherein it is determined whether or not the facsimile transmission is completed. If the facsimile transmission is completed, the process proceeds to a step S517, wherein the processing result to be sent as a response to the inquiry from the PC is set to "transmission completed", and a next process is executed in a step S518.

If the facsimile transmission has not been completed, the process proceeds to a step S519, wherein it is determined whether or not the facsimile transmission is unsuccessful. If the facsimile transmission is not unsuccessful, the process proceeds to a step S520, wherein another process is executed.

If the facsimile transmission is unsuccessful, the process proceeds to a step S521, wherein it is determined whether or not the number of trials of redialing is within a predetermined value. If the number of trials of redialing is within the predetermined value, the process proceeds to a step S522. If the number of trials of redialing is not within the predetermined value, the process proceeds to a step S526, wherein the processing result to be sent as a response to the inquiry from the PC is set to "unsuccessful redialing transmission, terminated in error", and a next process is executed in a step S527.

In the step S522, the processing result to be sent as a response to the inquiry from the PC is set to "on standby for redialing", and the process proceeds to a step S523. In the step S523, it is determined whether or not it is time to start redialing, and if it is not time to start redialing, the process proceeds to a step S524, wherein another process is executed. If it is time to start redialing, the process proceeds to a step S525, wherein the transmission by redialing is started.

FIG. 12 is a flowchart of an information returning process executed by the MFP 15 which is the communication apparatus according to the present embodiment, for responding mainly to an inquiry of the processing result received from a PC.

In a step S601, in response to an inquiry from the PC, the information returning process is started. In a step S602, it is determined whether or not the inquiry from the PC is an inquiry about the processing result, and if it is the inquiry about the processing result, the process proceeds to a step S603, wherein the processing result is sent as a response.

If the inquiry from the PC is not an inquiry about the processing result, the process proceeds to a step S604, wherein it is determined whether or not the inquiry from the PC is an inquiry about the reconnection timing. Then, if it is determined that it is an inquiry about the reconnection timing, the process proceeds to a step S605, wherein the reconnection timing is sent as a response. In a step S606, a disconnection process is executed to disconnect the connection to the PC.

FIG. 13 is a flowchart of a process (mainly associated with the step S606 in FIG. 12) executed by the MFP 15 which is the communication apparatus according to the present embodiment, when the FAX transmission JOB is not terminated.

In a step S701, if the FAX transmission JOB is not terminated (not completed), the processing result set in FIGS. 11A and 11B is acquired. In a step S702, it is determined whether or not the processing result acquired in the step S702 indicates that the FAX transmission JOB is not terminated. If it is determined in the step S702 that the processing result indicates that the FAX transmission JOB is not completed, the process proceeds to a step S703, wherein the cause which prevented the FAX transmission JOB from being completed is identified, and according to the identified cause, it is determined whether or not the connection to the PC should be maintained. If it is determined in the step S703 that the connection to the PC should be maintained, the process proceeds to a step S704, wherein the connection to the PC is maintained. On the other hand, if it is determined in the step S702 that the processing result acquired in the step S701 does not indicate that the FAX transmission JOB is not completed, or if it is not determined based on the cause identified in the step S703 that the connection between the MFP 15 and the PC should be maintained, the process proceeds to a step S705, wherein a disconnecting process for disconnecting the connection between the MFP 15 and the PC is executed.

In the determination in the step S703, if the processing result is e.g. "performing transmission", it is considered that the FAX transmission JOB will soon be completed, and hence it is determined to maintain the connection to the PC without disconnecting the same. On the other hand, if the processing result is e.g. "on standby for redialing", it is considered that the FAX transmission JOB will not soon be completed, and hence it is determined to disconnect the connection to the PC, and a reconnection request from the PC should be awaited. This determination can be executed by looking up a value set in association with each processing result.

As described above, according to the present embodiment, after a PC connected to the MFP has transmitted a FAX transmission JOB to the MFP, it is possible to determine whether or not to disconnect the connection between the MFP and the PC, depending on the processing result of the FAX transmission JOB. That is, if the processing will soon be completed, it is possible to more quickly know the processing result by maintaining the connection without disconnecting the same.

Figure 14:
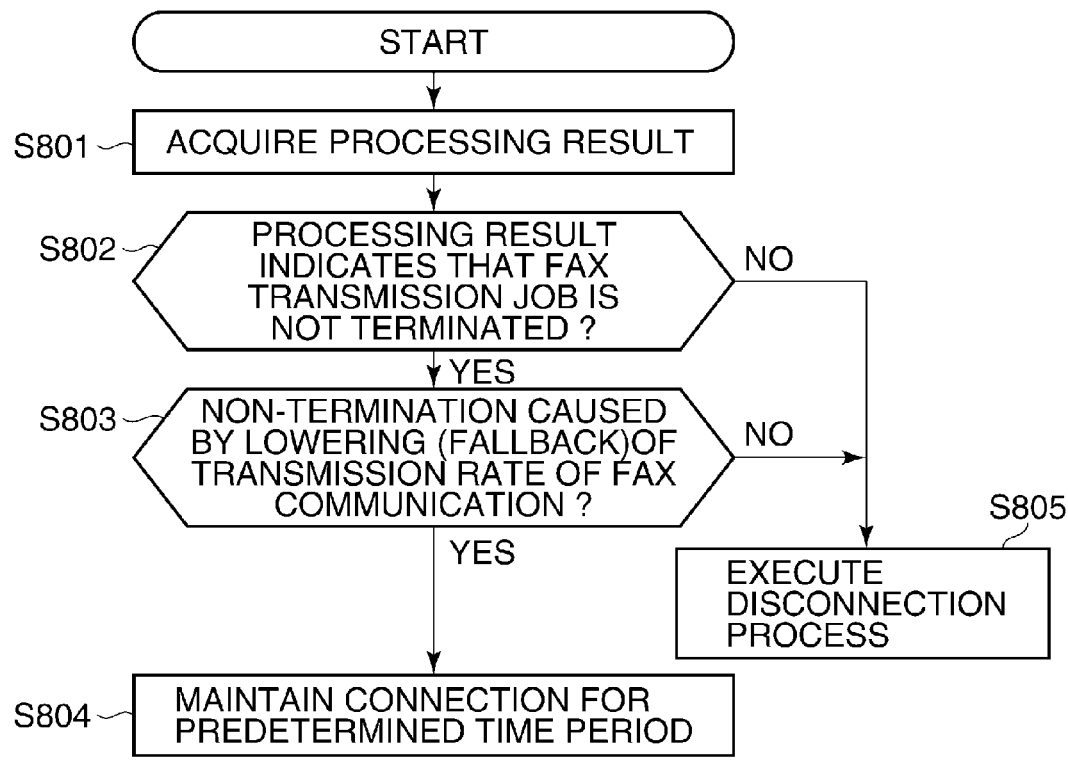
FIG. 14 is a flowchart of a process executed by a variation of the MFP which is the communication apparatus according to the fifth embodiment, when the FAX transmission JOB is not terminated.

FIG. 14 is a flowchart of a process (mainly associated with the step S606 in FIG. 12) executed by a variation of the MFP 15 which is the communication apparatus according to the fifth embodiment of the present invention, when the FAX transmission JOB is not terminated. The process shown in FIG. 14 replaces the process described hereinabove with reference to FIG. 13. In each of steps S801, S802, S804, and S805, the same processing as executed in the corresponding one of the steps S701, S702, S704, and S705 described with reference to FIG. 13 is executed, and hence detailed description thereof is omitted.

In a step S803, the cause which prevented the FAX transmission JOB from being completed is identified, and it is determined whether or not the identified cause is lowering (fallback) of the transmission rate of the facsimile communication. Then, if the identified cause is lowering (fallback) of the transmission rate in the facsimile communication, it is determined to maintain the connection to the PC without disconnecting the same. On the other hand, if the identified cause is not lowering (fallback) of the transmission rate in the facsimile communication (fallback), the PC is disconnected, and a reconnection request from the PC is awaited.

Figure 15:
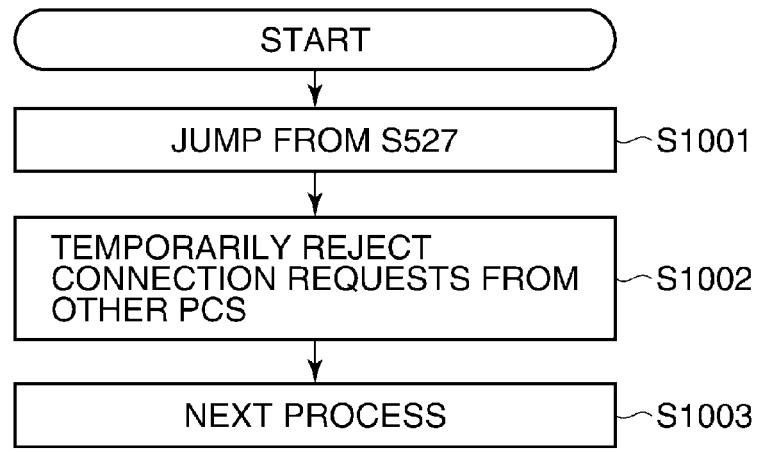
FIG. 15 is a flowchart of a process executed by a variation of the MFP which is the communication apparatus according to the fifth embodiment.

FIG. 15 is a flowchart of a process executed mainly by the FAX transmission JOB-executing section 106 of a variation of the MFP 15 which is the communication apparatus according to the fifth embodiment of the present invention. This process is executed in succession to FIG. 11B.

After the step S527 in FIG. 11B, the process jumps to a step S1001 in FIG. 15 flowchart and in a step S1002, the acceptance of connection requests from the other PCs is restricted. That is, here, the connection requests from the other PCs are rejected. Then, a next process is executed in a step S1003.

As described above, according to the present variation, if facsimile transmission is not normally terminated, connection requests from the other PCs are rejected, which enables the PC which has requested execution of the FAX transmission JOB to more quickly know the processing result.

Figure 16:
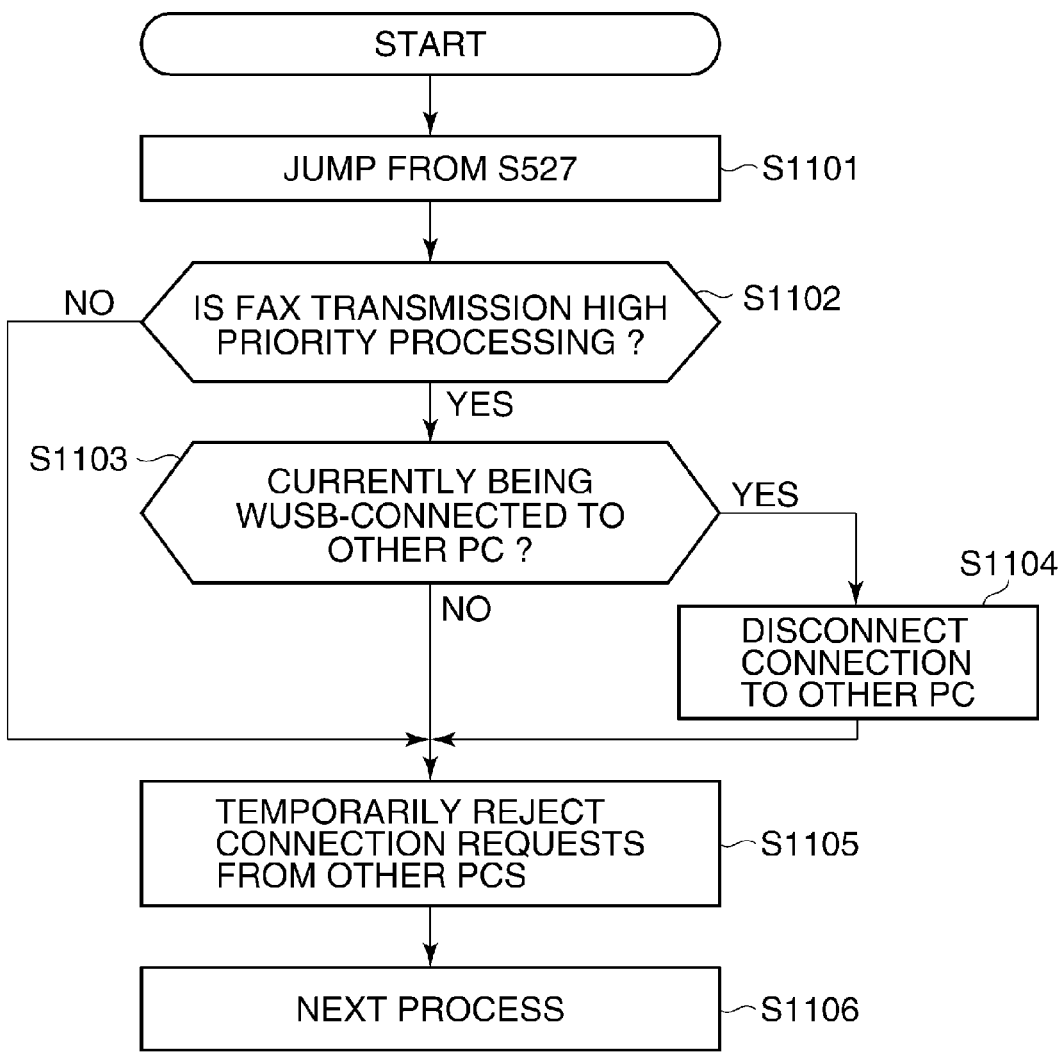
FIG. 16 is a flowchart of a process executed by a variation of the MFP which is the communication apparatus according to the fifth embodiment.

FIG. 16 is a flowchart of a process executed mainly by the FAX transmission JOB-executing section 106 of a variation of the MFP 15 which is the communication apparatus according to the fifth embodiment. This process is executed in succession to FIG. 11B. The process shown in FIG. 16 replaces the process described hereinabove with reference to FIG. 15.

After the step S527 in FIG. 11B, the process jumps to a step S1101 in FIG. 16, and it is determined in a step S1102 whether or not the facsimile transmission executed by the FAX transmission JOB-executing section 106 is high-priority processing. This determination is carried out based on priority information preset in a PC which transmits a FAX transmission JOB.

If the facsimile transmission executed by the FAX transmission JOB-executing section 106 is not high-priority processing, the process proceeds to steps S1105 and S1106 corresponding to the steps S1002 and S1003 in FIG. 15, respectively, to execute the same processing.

On the other hand, if the facsimile transmission executed by the FAX transmission JOB-executing section 106 is high-priority processing, the process proceeds to a step S1103, wherein it is determined whether or not the MFP 15 is currently connected to another PC (i.e. PC which is different from the PC which has transmitted the FAX transmission JOB) by WUSB. Then, if it is determined that the MFP 15 is currently connected to the other PC by WUSB, the process proceeds to a step S1104, wherein the currently connected PC is disconnected, and the process proceeds to the step S1105.

As described above, according to this variation, if the MFP 15 is currently connected to the other PC by WUSB in a case where the facsimile transmission is not normally terminated, the connection to the other PC is immediately terminated. This makes it possible for the PC which has requested to execute the FAX transmission JOB to more quickly know the processing result.

Figure 17A:
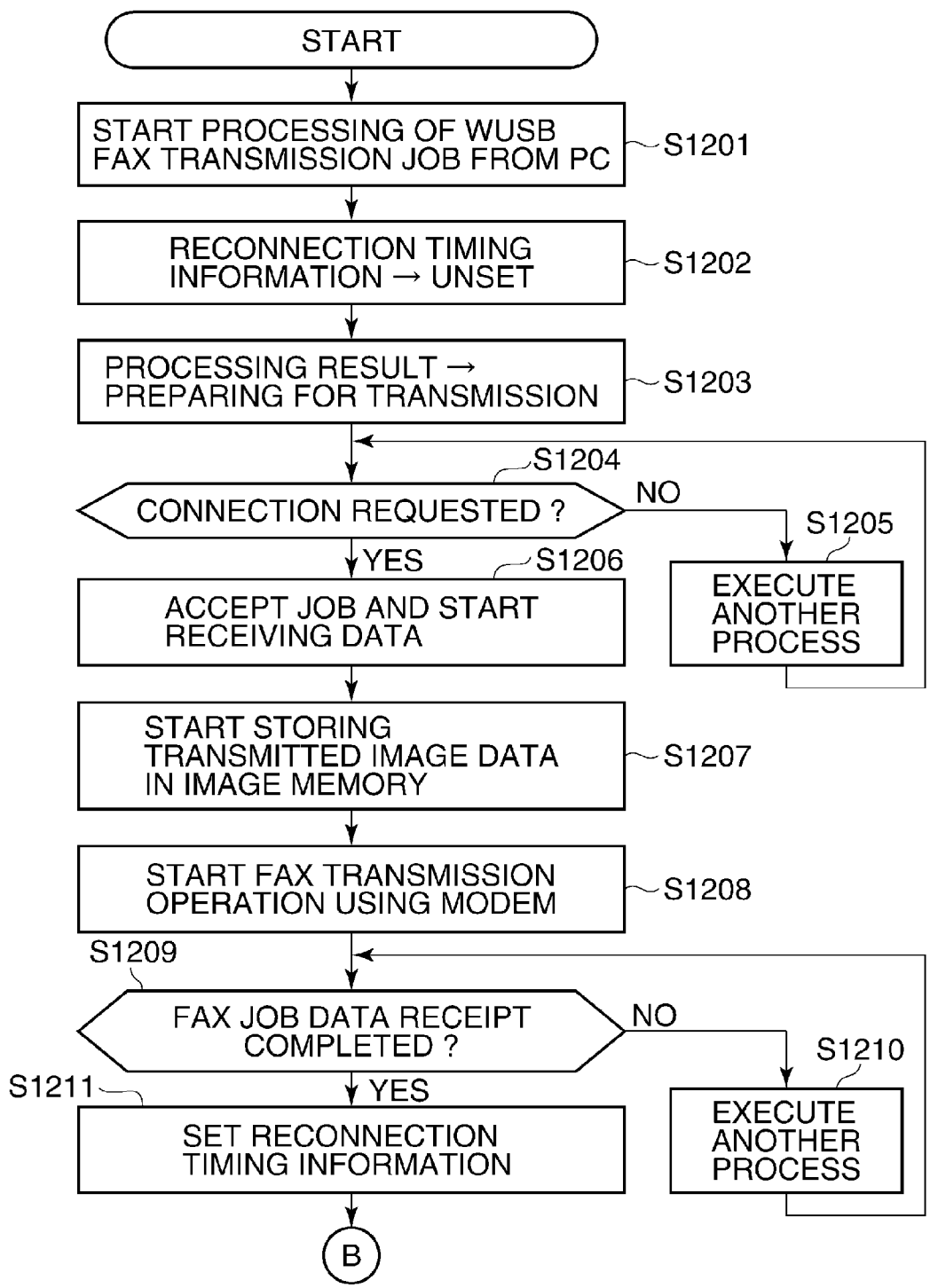
FIG. 17A is a flowchart of a FAX transmission process by a variation of the MFP which is the communication apparatus according to the fifth embodiment.
Figure 17B:
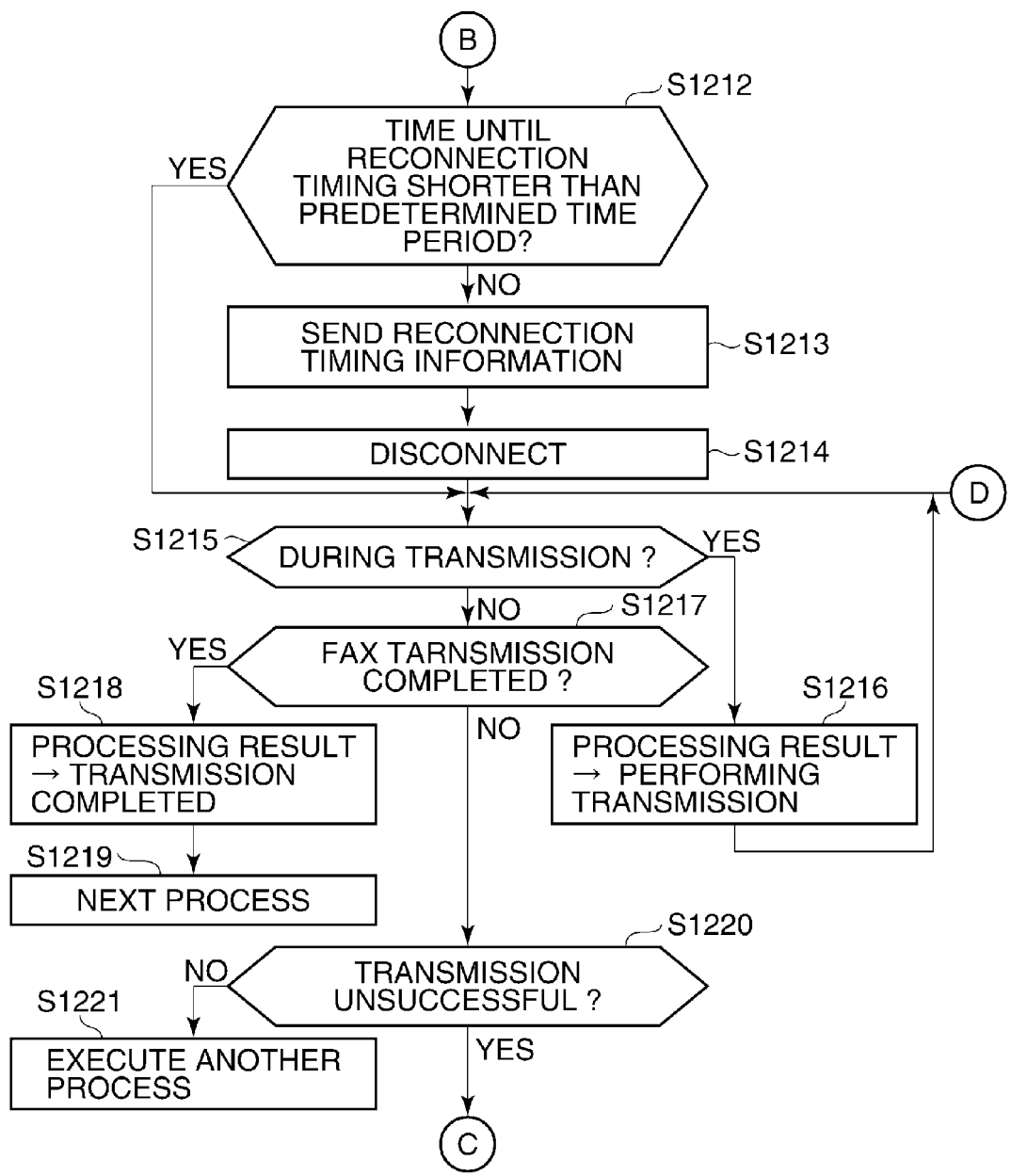
FIG. 17B is a continuation of FIG. 17A.
Figure 17C:
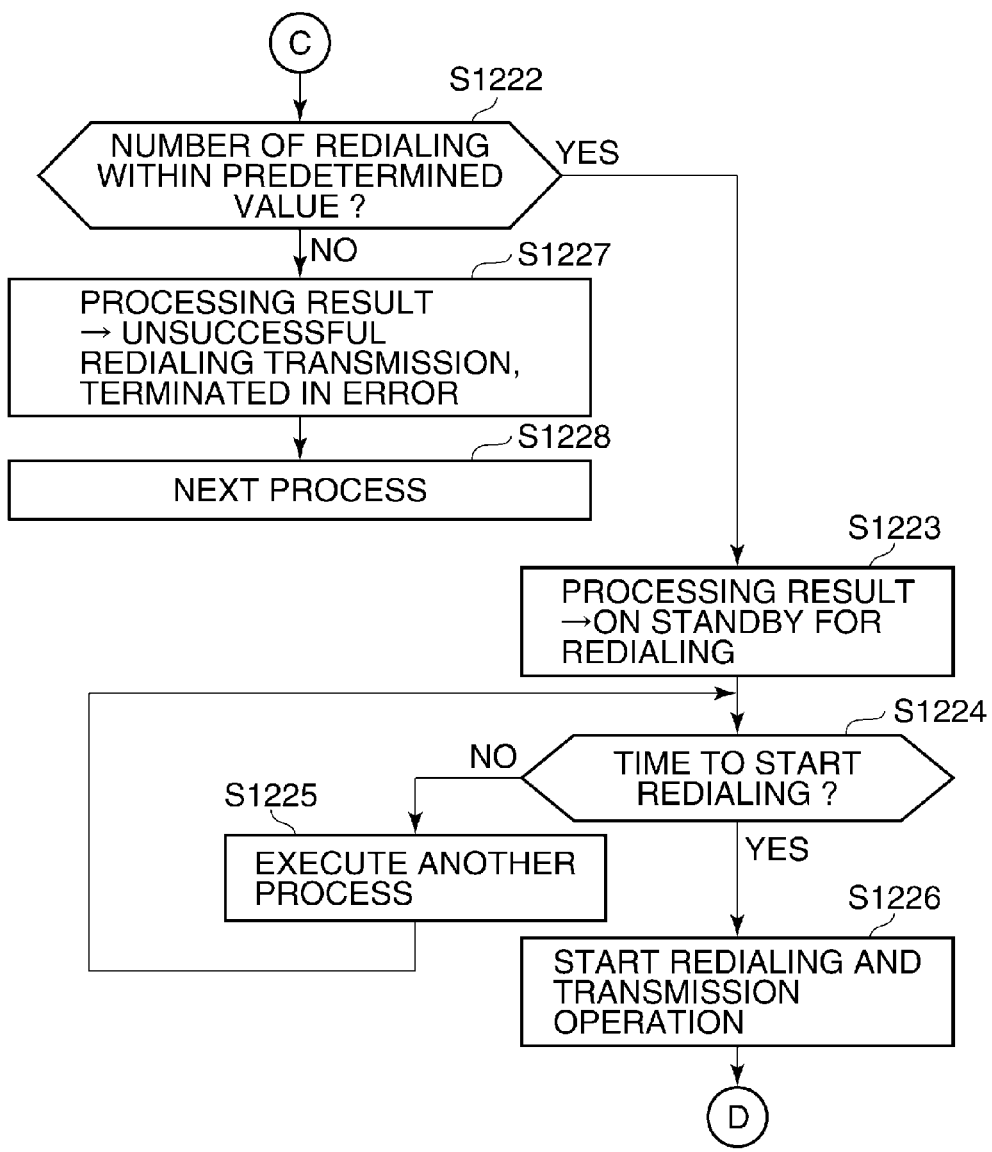
FIG. 17C is a continuation of FIG. 17B.
Figure 18:
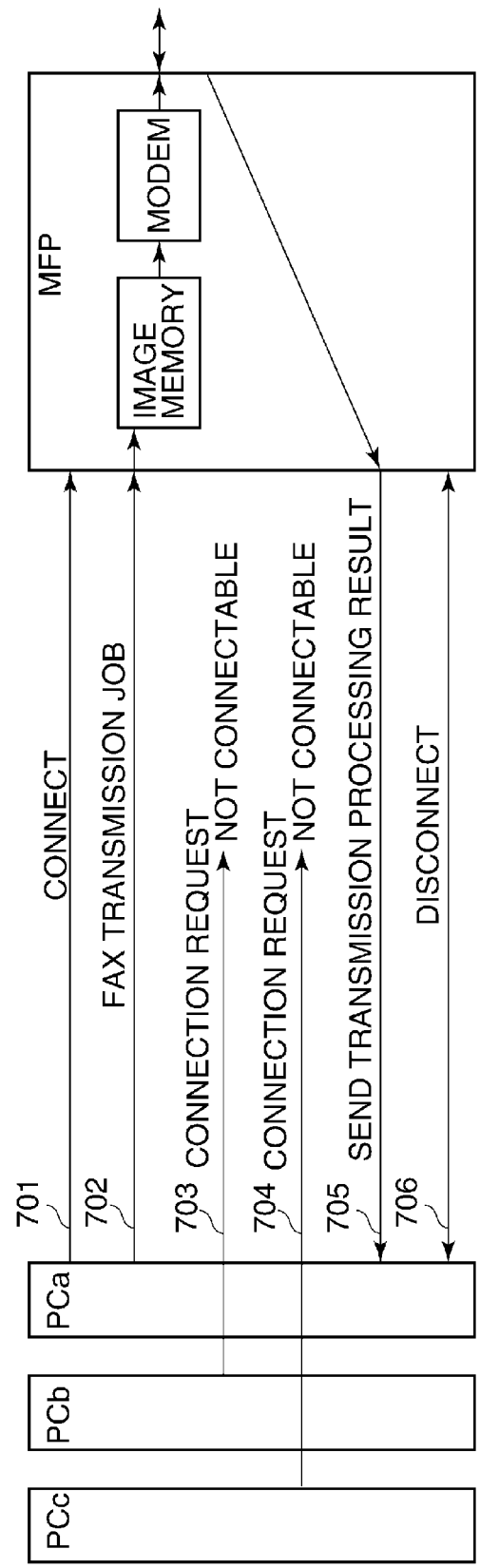
FIG. 18 is a sequence diagram useful in explaining a related art process for requesting an MFP from the PC to execute a FAX transmission JOB.
Figure 19:
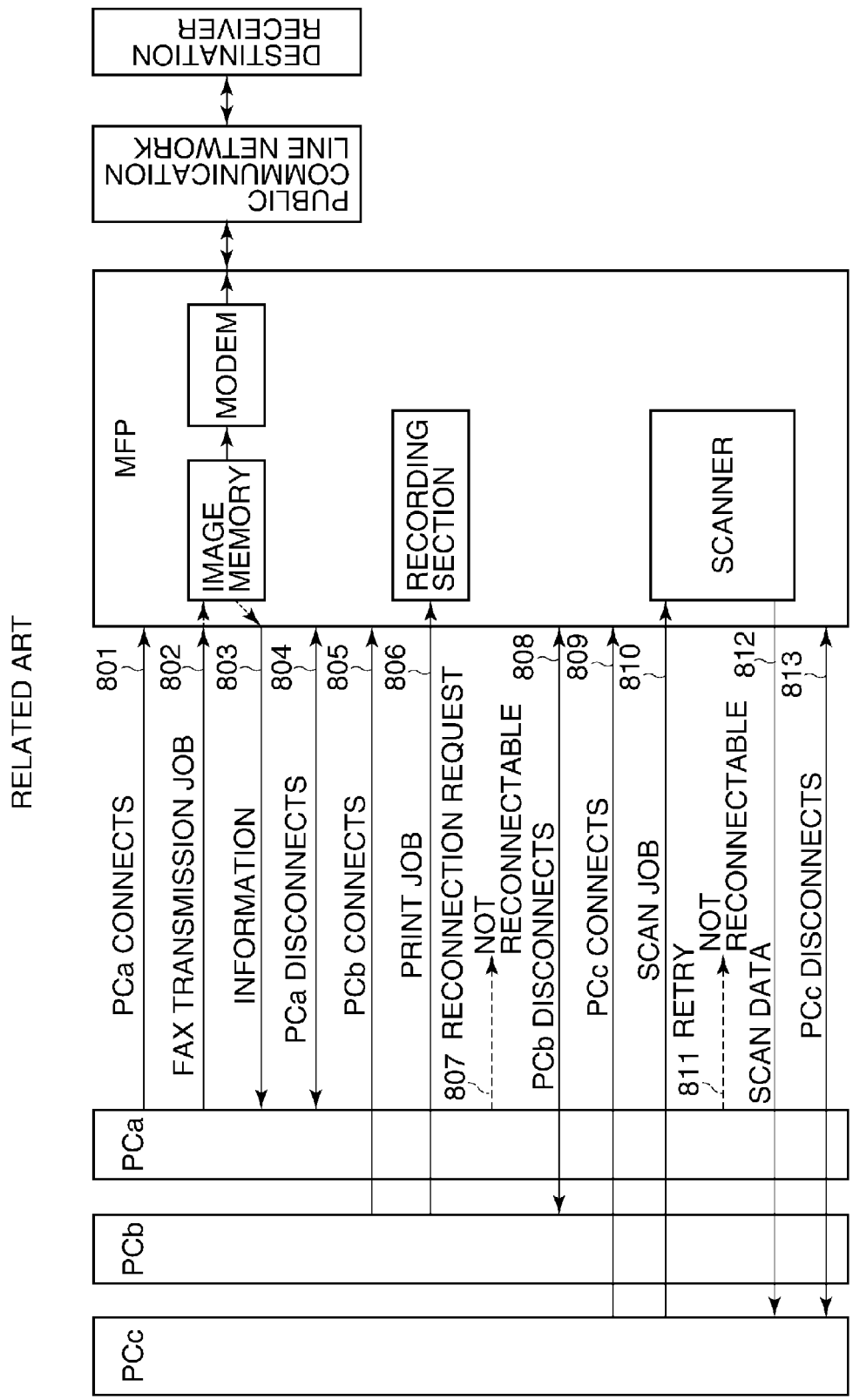
FIG. 19 is a sequence diagram useful in explaining another related art process for requesting a MFP from a PC to execute a FAX transmission JOB.

FIGS. 17A, 17B and 17C are a flowchart of a process executed mainly by the FAX transmission JOB-executing section 106 of a variation of the MFP 15 which is the communication apparatus according to the fifth embodiment. The process shown in FIGS. 17A, 17B and 17C replaces the processes described with reference to FIGS. 11A and 11B. FIGS. 17A, 17B and 17C are different from the FIGS. 11A and 11B only in that a step S1212 is added.

In the step S1212, it is determined whether or not time taken until reconnection timing comes which is set in a step S1211 (corresponding to S511 in FIG. 11A) is shorter than a predetermined time period. If it is determined in the step S1212 that the time taken until the reconnection timing comes is shorter than the predetermined time, the process skips steps S1213 and S1214 (corresponding to S512 and S513 in FIG. 11A). That is, the process for disconnecting the currently connected PC is not carried out.

As described above, according to the present variation, if the time until the set reconnection timing comes is short, the currently connected PC is not disconnected, which enables the PC which has requested to execute the FAX transmission JOB to quickly know the processing result.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-076592, filed Mar. 26, 2009, which is hereby incorporated by reference herein in its entirety.

What is claimed is:

1. A communication apparatus that is capable of performing wireless communication with a plurality of host computers, comprising:
an accepting unit adapted to accept a connection request from one host computer of the plurality of host computers;
a processing unit adapted to connect to the host computer which has sent the connection request, in response to the connection request accepted by said accepting unit, and execute a process requested by the connected host computer;
a storing unit adapted to store information indicative of the connected host computer, including the executed process; and
a control unit adapted to perform control such that said accepting unit accepts a reconnection request from the host computer indicated by the information stored by said storing unit, with priority over connection requests from other host computers.

2. The communication apparatus according to claim 1, further comprising a predicting unit adapted to predict timing in which the reconnection request is received from the host computer indicated by the information stored by said holding unit,
wherein said control unit performs the control based on the timing predicted by said predicting unit.

3. The communication apparatus according to claim 1, further comprising a management unit adapted to manage information indicative of host computers which made connection requests to the communication apparatus, and
wherein even if information indicative of the other host computers is managed by said management unit, said control unit performs control such that said accepting unit accepts the reconnection request from the host computer indicated by the information stored by said storing unit, with priority.

4. The communication apparatus according to claim 1, further comprising a notification unit adapted to be operable when the reconnection request from the host computer indicated by the information stored by said storing unit is accepted, to connect to the host computer which has made the reconnection request and notify the host computer of a result of processing executed by said processing unit.

5. The communication apparatus according to claim 4, further comprising a printing unit adapted to be operable when a predetermined time period elapses without accepting the reconnection request from the host computer indicated by the information stored by said storing unit, to print out a report indicative of the result of processing executed by said processing unit.

6. The communication apparatus according to claim 1, further comprising a maintaining unit adapted to be operable when the reconnection request from the host computer indicated by the information stored by said storing unit is accepted by said accepting unit, to maintain, if the process executed by said processing unit is not completed, the connection to the host computer which has made the reconnection request, until the process executed by said processing unit is completed.

7. The communication apparatus according to claim 1, wherein if the process executed by said processing unit is not normally completed, said control unit controls said accepting unit such that said accepting unit rejects connection requests from other host computers than the host computer indicated by the information stored by said storing unit.

8. The communication apparatus according to claim 1, further comprising a determining unit adapted to determine whether or not to maintain the connection to the host computer which has made the connection request without disconnecting the connection until the process executed by said processing unit is completed, according to a time period required for said processing unit to execute the process.

9. A method of controlling a communication apparatus that is capable of performing wireless communication with a plurality of host computers, comprising:
accepting a connection request from one host computer of the plurality of host computers;
connecting to the host computer which has sent the connection request, in response to the connection request accepted by said accepting, and executing a process requested by the connected host computer;
storing information indicative of the connected host computer, including the executed process; and
performing control such that a reconnection request from the host computer indicated by the information stored by said storing is accepted with priority over connection requests from other host computers.

10. A non-transitory computer-readable storage medium storing a program for causing a computer to execute a method of controlling a communication apparatus that is capable of performing wireless communication with a plurality of host computers,
wherein the method comprises:
accepting a connection request from one host computer of the plurality of host computers;
connecting to the host computer which has sent the connection request, in response to the connection request accepted by said accepting, and executing a process requested by the connected host computer;
storing information indicative of the connected host computer, including the executed process; and
performing control such that a reconnection request from the host computer indicated by the information stored by said storing is accepted with priority over connection requests from other host computers.

* * * * *